United States Patent
Katsuyama et al.

(10) Patent No.: US 8,254,689 B2
(45) Date of Patent: Aug. 28, 2012

(54) CHARACTER RECOGNITION PROCESSING METHOD AND APPARATUS

(75) Inventors: Yutaka Katsuyama, Kawasaki (JP); Yoshinobu Hotta, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 12/652,556

(22) Filed: Jan. 5, 2010

(65) Prior Publication Data

US 2010/0104192 A1    Apr. 29, 2010

Related U.S. Application Data

(63) Continuation of application No. PCT/JP2007/064554, filed on Jul. 25, 2007.

(51) Int. Cl.
*G06K 9/46* (2006.01)

(52) U.S. Cl. .......... 382/190; 345/467; 382/187

(58) Field of Classification Search .......... 345/441; 382/171, 182, 190, 210, 236, 305
See application file for complete search history.

(56) References Cited

U.S. PATENT DOCUMENTS

| | | | | |
|---|---|---|---|---|
| 4,903,313 A * | 2/1990 | Tachikawa | | 382/171 |
| 5,524,065 A | 6/1996 | Yagasaki | | |
| 6,064,769 A * | 5/2000 | Nakao et al. | | 382/224 |
| 6,141,443 A * | 10/2000 | Nakao et al. | | 382/174 |
| 6,996,280 B1 * | 2/2006 | Matsukawa et al. | | 382/236 |
| 7,174,044 B2 * | 2/2007 | Ding et al. | | 382/210 |
| 2001/0019628 A1 | 9/2001 | Fujimoto et al. | | |
| 2005/0140679 A1 * | 6/2005 | Kaneda | | 345/441 |
| 2010/0104192 A1 * | 4/2010 | Katsuyama et al. | | 382/190 |

FOREIGN PATENT DOCUMENTS

| | | |
|---|---|---|
| JP | A 54-23434 | 2/1979 |
| JP | A 5-274436 | 10/1993 |
| JP | A 6-187507 | 7/1994 |
| JP | A 8-16725 | 1/1996 |
| JP | A 10-289320 | 10/1998 |
| JP | A 2000-172784 | 6/2000 |

OTHER PUBLICATIONS

Kimura Fumitaka, et al., "Modified Quadratic Discriminant Functions and the Application to Chinese Character Recognition," IEEE Transactions on Pattern Analysis and Machine Intelligence, vol. PAM1-9, No. 1, pp. 149-153, Jan. 1, 1987.

Fujimoto Katsuhito, et al., "Fast, Precise Pre-classification Method Using Projections of Feature Regions," Technical Report of IEICE. vol. 97 No. 558, PRMU97-217 to 239, The Institute of Electronics, Information and Communication Engineers, pp. 25-32, Feb. 1998.

* cited by examiner

*Primary Examiner* — Gregory M Desire
(74) *Attorney, Agent, or Firm* — Fujitsu Patent Center

(57) ABSTRACT

This method includes: extracting a feature vector for an input character from a reading result of the input character; calculating distances between the feature vector for the input character and vectors including average vectors stored in a system dictionary storing, for each character, the average vector and distribution information, and feature vectors stored in a user dictionary; extracting the top N character codes in an ascending order of the calculated distances; obtaining second distribution information for the character codes, which are included the user dictionary and in the top N character codes; calculating, for each of the top N character codes, a second distance with the feature vector for the input character, by using, for the character codes, which are included in the user dictionary and in the top N character codes, the second distribution information; and identifying a character code whose second distance is shortest.

11 Claims, 21 Drawing Sheets

| SYSTEM DICTIONARY (S)/ USER DICTIONARY (U) | CHARACTER CODE | DISTANCE |
|---|---|---|
| S | code1 | $d_1$ |
| U | code2 | $d_2$ |
| S | code3 | $d_3$ |
| ⋮ | ⋮ | ⋮ |

| RECOGNITION METHOD | ONLY SYSTEM DICTIONARY | SYSTEM DICTIONARY + ONLY SPECIFIC CHARACTERS | SYSTEM DICTIONARY + FONT A (CATEGORIES ARE LIMITED) | SYSTEM DICTIONARY + FONT A | SYSTEM DICTIONARY + FONT B (CATEGORIES ARE LIMITED) |
|---|---|---|---|---|---|
| 0) CONVENTIONAL METHOD | 98.121% | 98.141% | 98.077% | 97.608% | 98.096% |
| 1) 1ST EMBODIMENT | 98.426% | 98.447% | 98.314% | 97.949% | 98.306% |
| 2) 2ND EMBODIMENT | 98.426% | 98.447% | 98.314% | 98.001% | 98.306% |
| 3) 3RD EMBODIMENT | 98.426% | 98.447% | 98.314% | 98.070% | 98.306% |

FIG.11

CHARACTER RECOGNITION PROCESSING METHOD AND APPARATUS

CROSS-REFERENCE TO RELATED APPLICATIONS

This application is a continuing application, filed under 35 U.S.C. section 111(a), of International Application PCT/JP2007/064554, filed Jul. 25, 2007.

FIELD

This technique relates to a character recognition processing technique.

BACKGROUND

Recently, a law that allows to electronically save documents is enforced, demands of the Optical Character Recognition (OCR) increase more and more, and the scene of utilizing the OCR becomes diversified, too. Up to now, a dictionary including the finite number of fixed categories (also called character codes), such as characters in Japanese Industrial Standards (JIS) first level, hiragana & Katakana in Japanese, symbols and characters in JIS second level, could cope with the requirements from the typical users. However, when the users are diversified, the categories required for the OCR become different for each user. Therefore, it is necessary to cope with such a situation.

A conventional OCR apparatus has, as a framework to flexibly add the categories for each user, a user dictionary. This is a mechanism that, when the user manually cuts out and registers a character (including patterns such as symbols. Hereinafter, the word "character" includes such patterns.) to be recognized, a feature vector of the character is registered, and in the subsequent recognition processing, the character registered in the user dictionary can also be recognized and the recognition result can be obtained, even if the character is not registered in a system dictionary.

On the other hand, recently, a method using distribution characteristics such as the Modified Quadratic Discriminate Function (MQDF) has come to be utilized in order to improve the accuracy of the character recognition. This method utilizes the distributions of learning samples for the respective character codes to realize more accurate character recognition than the character recognition using the conventional Cityblock distance, which is calculated using only the average vector of the feature vectors of the learning samples.

Under such a situation, for example, Japanese Laid-open Patent Publication No. 08-16725 discloses a technique to simplify jobs to register new character information into a character recognition dictionary including, for each character, a feature vector and a variance-covariance matrix and to construct the dictionary with high accuracy. Specifically, an image of an unknown character, which is not included in the recognition dictionary, is read out, and feature vector data is extracted from the character image. Next, a character having a feature vector closest to this extracted feature vector is retrieved from the recognition dictionary. When registering the character obtained in this way, the character code and feature vector for this character are stored into the dictionary, and the variance-covariance matrix for the previously extracted character is stored as the variance-covariance matrix for this character. According to this technique, there is no user dictionary. Therefore, when registering the unknown character into the recognition dictionary, there is a problem, for example, the size of the recognition dictionary becomes large.

Here, when considering the user dictionary again, the distribution information is not registered into the user dictionary. Therefore, a method such as MQDF, in which the distribution information is used, cannot be used for the characters registered in the user dictionary. Specifically, two types of distance values, namely cityblock and MQDF, to determine the order of cutting out the character or the candidate characters are mixed. Therefore, by simultaneously using the user dictionary and the technique such as MQDF, the recognition accuracy is lowered rather than a case where they are not used.

Namely, in the conventional techniques, there is no character recognition processing technique to improve the recognition accuracy without enlarging the size of the dictionary too much.

SUMMARY

According to an aspect of this technique, a character recognition processing method includes: extracting a feature vector for an input character from a reading result of the input character; calculating distances between the feature vector for the input character and vectors including average vectors stored in a system dictionary storing, for each character, the average vector of the feature vectors and distribution information, and feature vectors stored in a user dictionary storing, for each character, the feature vector; extracting a top predetermined number of character codes in an ascending order of the calculated distances; obtaining second distribution information for the character codes, which are extracted from the user dictionary and included in the top predetermined number of character codes; calculating, for each of the top predetermined number of character codes, a second distance with the feature vector for the input character, by using, for the character codes, which are extracted from the user dictionary and included in the top predetermined number of character codes, said second distribution information, and by using, for the character codes, which are extracted from the system dictionary and included in the top predetermined number of character codes, the corresponding distribution information in the system dictionary; and identifying a character code whose second distance is shortest.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 11 is a diagram depicting effects of the first to third embodiments of this technique;

DESCRIPTION OF EMBODIMENTS

First Embodiment

Figure 1:
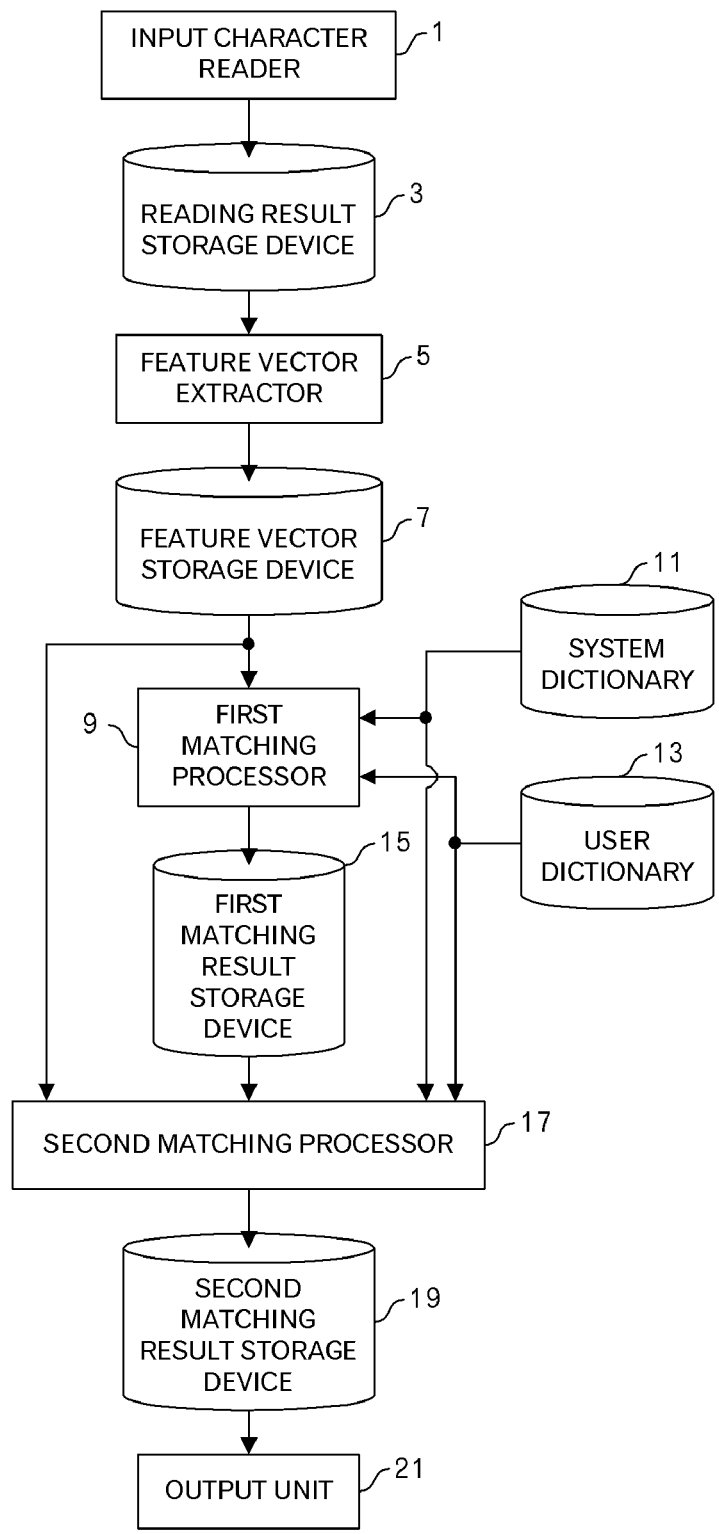
FIG. 1 is a functional block diagram in a first embodiment of this technique.

FIG. 1 depicts a functional block diagram of a character recognition processing apparatus according to a first embodiment. The character recognition processing apparatus according to this embodiment has an input character reader 1 that reads characters, for example, optically; a reading result storage device 3 that stores a reading result by the input character reader 1; a feature vector extractor 5 that carries out a processing to extract feature vectors for the input characters based on data stored in the reading result storage device 3; a feature vector storage device 7 that stores data of the feature vectors extracted by the feature vector extractor 5; a system dictionary 11 that stores average vectors of the feature vectors and distribution information (including an eigen value, eigen vector and the like) for each of the predetermined character codes; a user dictionary 13 that stores the feature vectors for character codes specified by the user; a first matching processor 9 that carries out a processing to calculate the distance with the feature vector of the input character by using data stored in the feature vector storage device 7, the system dictionary 11 and user dictionary 13 without using the distribution information; a first matching result storage device 15 that stores the processing result of the first matching processor 9; a second matching processor 17 that carries out a processing to calculate the distance for the input character based on the distribution information by using data stored in the feature vector storage device 7, the first matching result storage device 15, the system dictionary 11 and the user dictionary 13; a second matching result storage device 19 that stores the matching result of the second matching processor 17; and an output unit 21 that outputs data stored in the second matching result storage device 19 to other program modules or the like.

Figure 2:
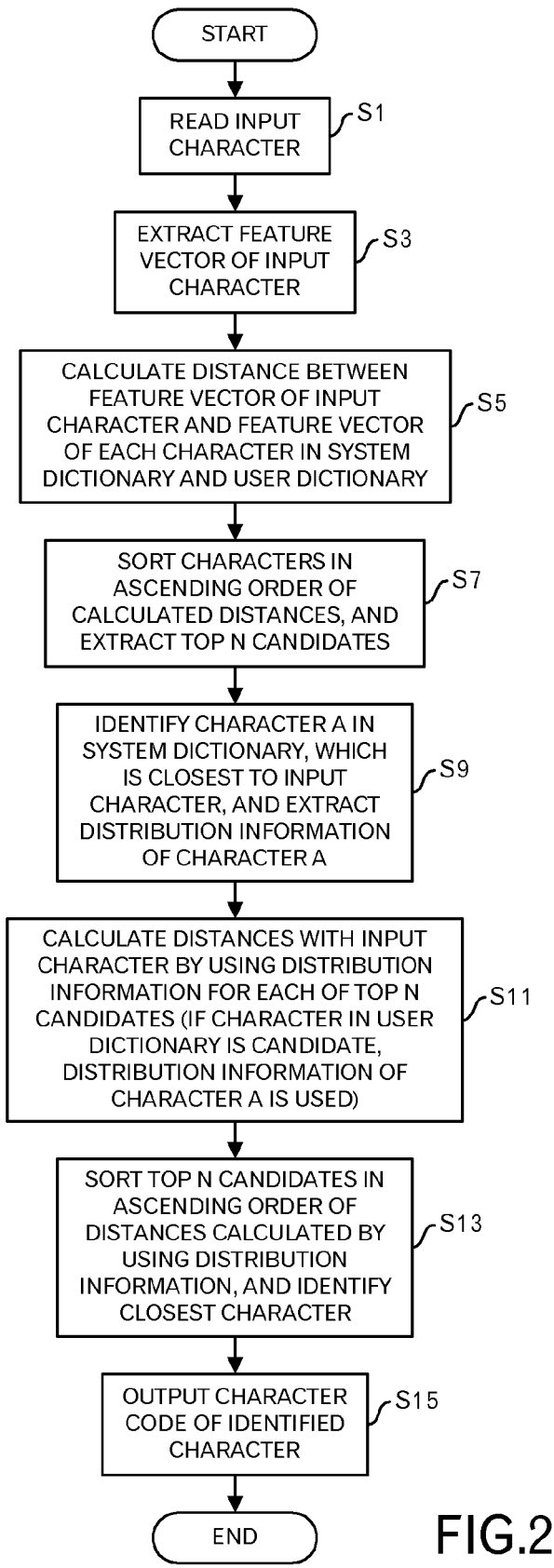
FIG. 2 is a diagram depicting a processing flow in the first embodiment of this technique.

Next, processing contents of the character recognition processing apparatus depicted in FIG. 1 will be explained by using FIGS. 2 to 4. First, the input character reader 1 reads input characters to be recognized, for example, optically, and stores the reading result into the reading result storage device 3 (step S1). This processing itself is the same as the conventional one. Therefore, further explanation is omitted. Next, the feature vector extractor 5 carries out a processing to extract the feature vectors of the input characters for the reading result stored in the reading result storage device 3, and stores data of the extracted feature vectors into the feature vector storage device 7 (step S3). This processing is also the same as the conventional one. Therefore, further explanation is omitted.

Then, the first matching processor 9 calculates the distances with the feature vector of the input character, which is stored in the feature vector storage device 7, by using the average vectors (hereinafter, may be generally called feature vectors) of the feature vectors of the respective character codes, which are stored in the system dictionary 11, and the feature vectors of the respective character codes, which are stored in the user dictionary 13, without using the distribution information, and stores the distances into the first matching result storage device 15 (step S5). The distance without using the distribution information is calculated as described below.

Specifically, the Cityblock distance is represented by the following equation.

$$d = \sum_i |x_i - u_i| \qquad (1)$$

Incidentally, $x_i$ is a value of the i-th element in the feature vector of the input character, and $u_i$ is a value of the i-th element in the feature vector of a specific character in the system dictionary 11 or user dictionary 13.

The Euclid distance is represented by the following equation.

$$d = \sum_i (x_i - u_i)^2 \qquad (2)$$

After that, the first matching processor 9 sorts the character codes in an ascending order of the calculated distances, extracts the top N candidates and stores the top N candidates into the first matching result storage device 15 (step S7). For example, data as depicted in FIG. 3 is stored into the first matching result storage device 15. In an example of FIG. 3, distinction of the system dictionary (S) and user dictionary (U), character codes and calculated distances are registered. At the step S7, only the top N character codes after the sorting are stored into the first matching result storage device 15.

Next, the second matching processor 17 scans the first matching result storage device 15 to identify a character A, which is registered in the system dictionary 11 and is closest to the input character, and reads out the distribution information of the character A from the system dictionary 11 (step S9). In the example of FIG. 3, the character code "code1" is identified as the character, which is registered in the system dictionary 11 and is closest to the input character, and the distribution information (eigen value, eigen vector, and the like) of the character code "code1" is readout from the system dictionary 11, and stored into a storage device such as a main memory.

Then, the second matching processor 17 calculates a distance with the input character for each of the top N candidates stored in the first matching result storage device 15 by using the distribution information, and stores the distances into the second matching result storage device 19 (step S11). At this time, as for the input character, the feature vector of the input character, which is stored in the feature vector storage device 7, is used. As for the characters registered in the system dictionary 11, the average vector of the feature vectors, which is stored in the system dictionary 11, and the corresponding distribution are used, and as for the characters registered in the user dictionary 13, the feature vector stored in the user dictionary 13 and the distribution information extracted at the step S9 are used.

Figures 3, 4:
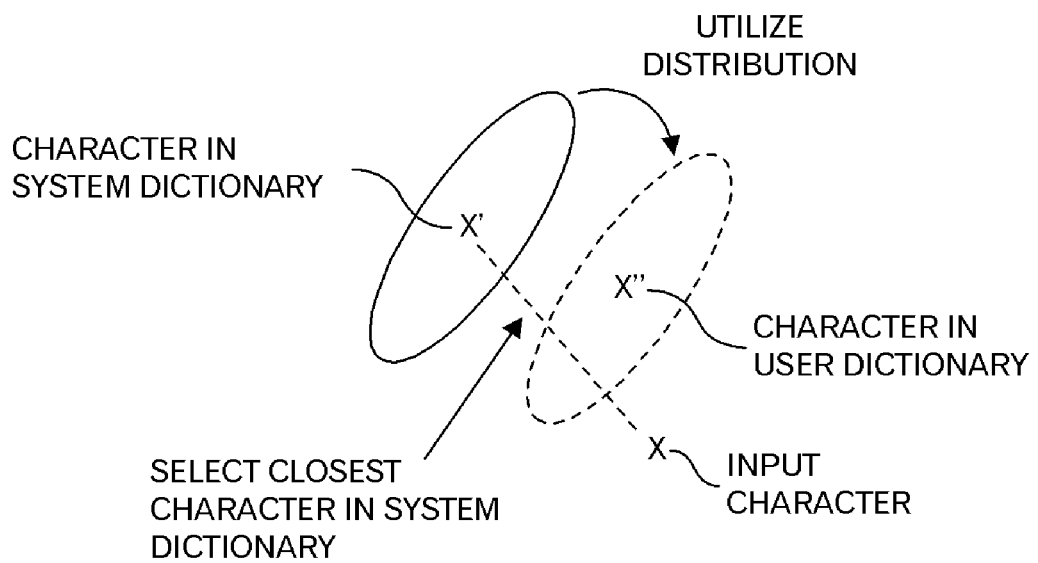
FIG. 3 is a diagram depicting an example of data stored in a first matching result storage device.
FIG. 4 is a schematic diagram depicting an outline of the first embodiment of this technique.

Namely, as depicted in FIG. 4, a character X' (i.e. the aforementioned character A) in the system dictionary 11, which is closest to the input character X, is identified, and the distribution of the character X' is used for a character X" in the user dictionary.

The distance to be calculated at the step S11 by using the distribution information is calculated according to MQDF. For example, improved Mahalanobis distance or Modified Quadratic Discriminate Function is used.

The improved Mahalanobis distance is represented as follows:

$$D_m(x, u) = \sum_{i=1}^{n} \frac{((x-u), \phi_i)^2}{\lambda_i} \quad (3)$$

Incidentally, "x" is the feature vector of the input character, "u" is a feature vector of a specific character in the system dictionary 11 or user dictionary 13, "$\phi_i$" is the i-th eigen vector of the specific character, "$\lambda_i$" is the i-th eigen value of the specific character, and "n" is the order of the eigen vector. The dominator in the equation (3) indicates the squared inner product of (x−u) and $\phi_i$.

In addition, the distance by the modified quadratic discriminate function is represented as follows:

$$g(x) = \sum_{i=1}^{k} \frac{1}{\lambda_i} \{\phi_i^T(x-\mu_M)\}^2 + \sum_{i=k+1}^{n} \frac{1}{h^2} \{\phi_i^T(x-\mu_M)\}^2 + \log\left(h^{2(n-k)} \prod_{i=1}^{k} \lambda_i\right) \quad (4)$$

Incidentally, "$\mu_M$" is the average vector of a category M, $h^2$ is a constant, "k" is an axis number representing the k-th and subsequent eigen values are assumed to be constant, "$\lambda_i$" is the i-th eigen value for the category M, "$\phi_i$" is the i-th eigen vector for the category M, and "n" is the order of the eigen vector. Incidentally, the equation (4) is disclosed, for example, in Fumitake Kimura, Kenji Takashina, Shinji Tsuruoka, and Yasuji Miyake, "Modified Quadratic Discriminant Functions and the Application to Chinese Character Recognition", IEEE TRANSACTIONS ON PATTERN ANALYSIS AND MACHINE INTELLIGENCE, VOL. PAM1-9, No. 1, JANUARY 1987, pp 149-153.

Incidentally, the data structure of the data stored in the second matching result storage device 19 is the same as the data structure depicted in FIG. 3.

Then, the second matching processor 17 sorts the top N candidates in an ascending order of the distances calculated by using the distribution information, identifies the character whose distance is shortest among the top N candidates, and stores the character code of the identified character into the second matching result storage device 19 (step S13).

Finally, the output unit 21 outputs the character code of the character identified at the step S13 to other program modules using the character recognition result or the like (step S15). Then, the processing completes.

By carrying out such a processing, the size of the user dictionary 13 does not become large too much because the distribution information is not included. However, because the distance is calculated by using the distribution information for the character registered in the user dictionary 13, like the character registered in the system dictionary 11, it becomes possible to output more desirable recognition results.

Second Embodiment

Figure 5:
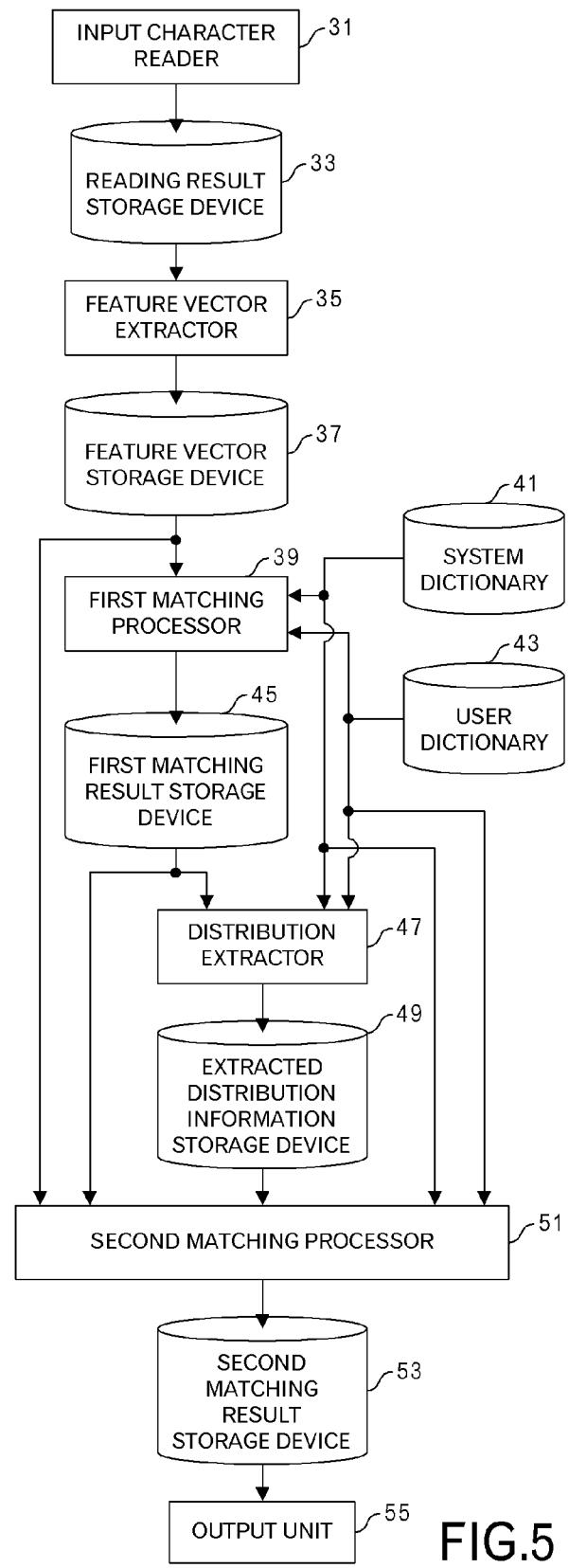
FIG. 5 is a functional block diagram in a second embodiment of this technique.

FIG. 5 depicts a functional block diagram of a character recognition processing apparatus according to a second aspect of this technique. The character recognition processing apparatus according to this embodiment has an input character reader 31 that reads characters, for example, optically; a reading result storage device 33 that stores a reading result by the input character reader 31; a feature vector extractor 35 that carries out a processing to extract feature vectors for the input characters based on data stored in the reading result storage device 33; a feature vector storage device 37 that stores data of the feature vectors extracted by the feature vector extractor 35; a system dictionary 41 that stores an average vector of the feature vectors and distribution information (including an eigen value, eigen vector and the like) for each of the predetermined character codes; a user dictionary 43 that stores the feature vectors for character codes specified by the user; a first matching processor 39 that carries out a processing to calculate the distance with the feature vector of the input character by using data stored in the feature vector storage device 37, the system dictionary 41 and the user dictionary 43 without using the distribution information; a first matching result storage device 45 that stores the processing result of the first matching processor 39; a distribution extractor 47 that extracts the distribution information to be applied to the character, which is extracted from the user dictionary 43 and stored in the first matching result storage device 45 by using the first matching result storage device 45, the system dictionary 41 and the user dictionary 43; an extracted distribution information storage device 49 that stores the distribution information extracted by the distribution extractor 47; a second matching processor 51 that carries out a processing to calculate the distance for the input character based on the distribution information by using data stored in the feature vector storage device 37, the first matching result storage device 45, the extracted distribution information storage device 49, the system dictionary 41 and the user dictionary 43; a second matching result storage device 53 that stores the matching result by the second matching processor 51; and an output unit 55 that outputs data stored in the second matching result storage device 53 to other program modules or the like.

Figure 6A:
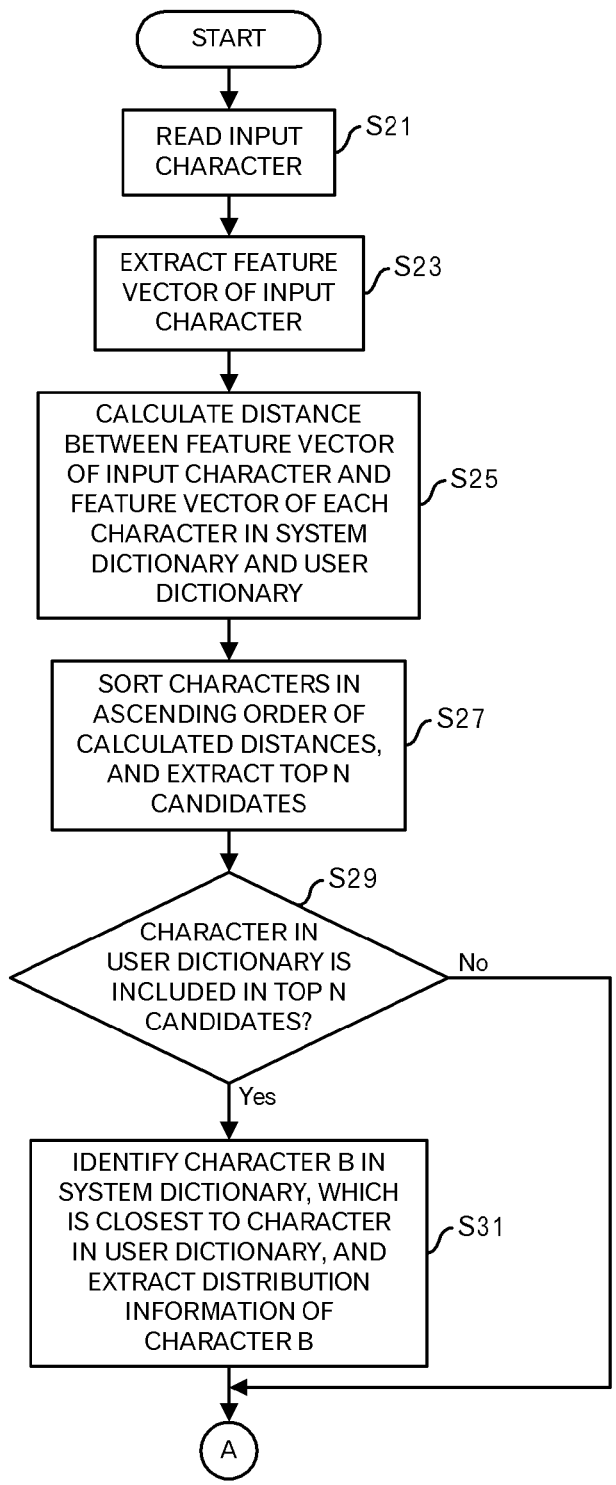
FIG. 6A is a diagram depicting a processing flow in the second embodiment of this technique.

Next, processing contents of the character recognition processing apparatus according to this embodiment will be explained by using FIGS. 6A to 7. First, the input character reader 31 reads input characters to be recognized, for example, optically, and stores the reading result into the reading result storage device 33 (step S21). This processing itself is the same as the conventional one. Therefore, further explanation is omitted. Next, the feature vector extractor 35 carries out a processing to extract the feature vectors of the input characters for the reading result stored in the reading result storage device 33, and stores data of the extracted feature vectors into the feature vector storage device 37 (step S23). This processing is also the same as the conventional one. Therefore, further explanation is omitted.

Then, the first matching processor 39 calculates the distances with the feature vector of the input character, which is stored in the feature vector storage device 37, by using the average vectors of the feature vectors of the respective character codes, which are stored in the system dictionary 41, and the feature vectors of the respective character codes, which are stored in the user dictionary 43, without using the distribution information, and stores the distances into the first matching result storage device 45 (step S25). The method for calculating the distance without using the distribution information is the same as the method described at the step S5.

After that, the first matching processor 39 sorts the character codes in an ascending order of the calculated distances, extracts the top N candidates and stores the top N candidates into the first matching result storage device 45 (step S27). For example, data as depicted in FIG. 3 is stored into the first matching result storage device 45.

Here, the distribution extractor 47 scans the first matching result storage device 45 to judge whether or not the top N candidates include characters registered in the user dictionary 43 (step S29). When no character registered in the user dictionary 43 is included in the top N candidates, the processing shifts to a processing depicted in FIG. 6B through a terminal A. On the other hand, when the character registered in the user dictionary 43 is included in the top N candidates, the distribution extractor 47 identifies a character B in the system dictionary 41, which is closest to the character that is registered in the user dictionary 43 and included in the top N candidates, reads out the distribution information of the character B from the system dictionary 41, and stores the extracted distribution information into the extracted distribution information storage device 49 (step S31). Specifically, by using, as reference, the character registered in the user dictionary 43 among the top N candidates, the distances with all of the characters registered in the system dictionary 41 are calculated without using the distribution information, and the closest character B in the system dictionary 41 is identified. When plural characters in the user dictionary 43 are included in the top N candidates, the aforementioned processing is carried out for each of the characters, which are registered in the user dictionary 43 and included in the top N candidates. The processing shifts to a processing depicted in FIG. 6B through the terminal A.

Figure 6B:
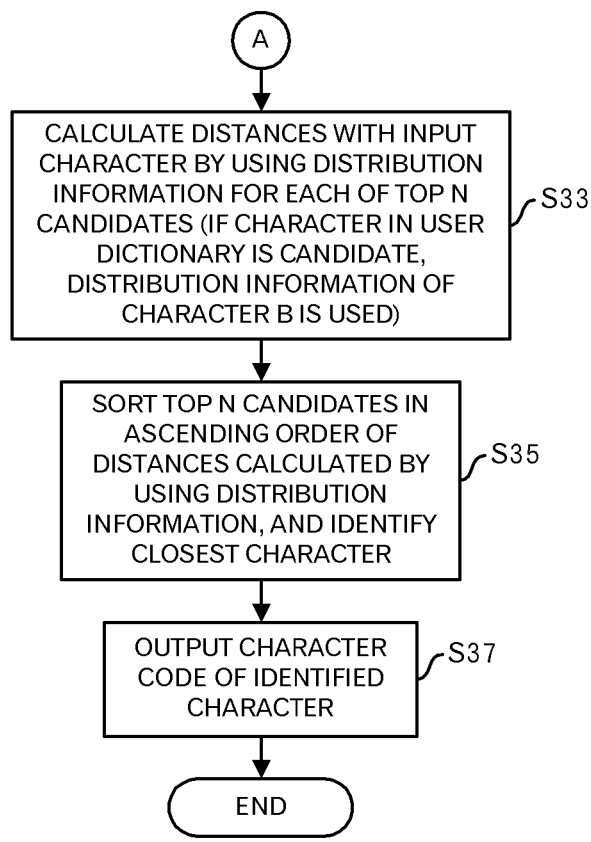
FIG. 6B is a diagram depicting a processing flow in the second embodiment of this technique.

Shifting to the explanation of the processing depicted in FIG. 6B, the second matching processor 51 calculates a distance with the input character by using the distribution information, for each of the top N candidates, which are stored in the first matching result storage device 45, and stores the calculated distances into the second matching result storage device 53 (step S33). At this time, as for the input character, the feature vector of the input character, which is stored in the feature vector storage device 37 is used. As for the character registered in the system dictionary 41, the average vector of the feature vectors and the distribution information, which are stored in the system dictionary 41, are used. As for the characters registered in the user dictionary 43, the feature vector stored in the user dictionary 43 and the distribution information, which was extracted at the step S41 and is stored in the extracted distribution information storage device 49, are used.

Figure 7:
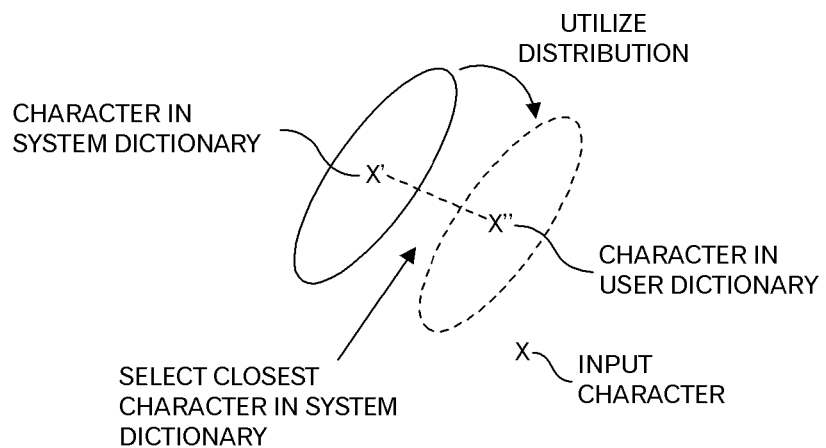
FIG. 7 is a schematic diagram depicting an outline of the second embodiment of this technique.

Namely, as depicted in FIG. 7, the character X' (namely, the aforementioned character B) in the system dictionary 41, which is closest to the character X" in the user dictionary 43, which is judged to be close to the input character X, is identified, and the distribution of the character X' is used for the character X" in the user dictionary 41.

The distance to be calculated at the step S33 by using the distribution information is calculated according to MQDF. Because the specific calculation is the same as the step S11, the explanation is omitted.

Then, the second matching processor 51 sorts the top N candidates in an ascending order of the distance calculated by using the distribution information, identifies the character whose distance with the input character is closest among the top N candidates, and stores the identified character code into the second matching result storage device 53 (step S35).

Finally, the output unit 55 outputs the character code identified at the step S35 to other program modules or the like, which utilize the character recognition result (step S37). Then, the processing is completed.

By carrying out such a processing, the size of the user dictionary 43 does not become large too much, because the distribution information is not included in the user dictionary 43. However, the distance can be calculated by using the distribution information for the characters in the user dictionary 43 like the characters in the system dictionary 41, and it becomes possible to output more desirable recognition results.

Incidentally, because the distribution extractor 47 is introduced, the amount of processing increases. However, the distribution of the character, which is closer to the character in the user dictionary 43, may be used, when viewed from the character in the user dictionary 43.

Third Embodiment

Figure 8:
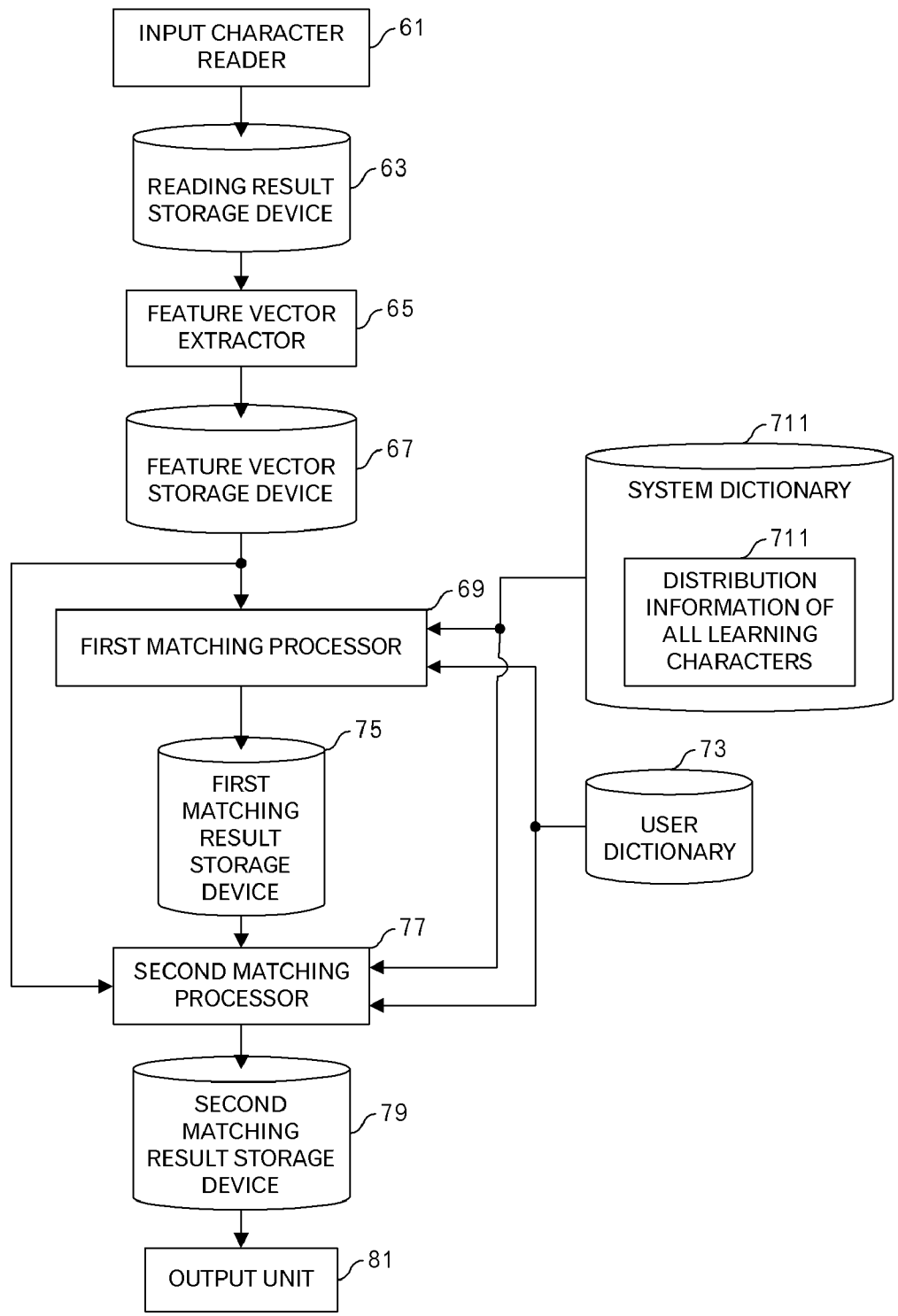
FIG. 8 is a functional block diagram in a third embodiment of this technique.

FIG. 8 depicts a functional block diagram of a character recognition processing apparatus according to a third embodiment of this technique. The character recognition processing apparatus according to this embodiment has an input character reader 61 that reads characters, for example, optically; a reading result storage device 63 that stores a reading result by the input character reader 61; a feature vector extractor 65 that carries out a processing to extract feature vectors for the input characters based on data stored in the reading result storage device 63; a feature vector storage device 67 that stores data of the feature vectors extracted by the feature vector extractor 65; a system dictionary 71 that stores average vectors of the feature vectors and distribution information (including an eigen value, eigen vector and the like) for each of the predetermined character codes in addition to distribution information 711 (including an eigen value, an eigen vector and the like) of all learning characters used when creating the system dictionary; a user dictionary 73 that stores the feature vectors for character codes specified by the user; a first matching processor 69 that carries out a processing to calculate the distance with the feature vector of the input character by using data stored in the feature vector storage device 67, the system dictionary 71 and the user dictionary 73 without using the distribution information; a first matching result storage device 75 that stores the processing result of the first matching processor 69; a second matching processor 77 that carries out a processing to calculate the distance for the input character based on the distribution information by using data stored in the feature vector storage device 67, the first matching result storage device 75, the system dictionary 71 and the user dictionary 73; a second matching result storage device 79 that stores the matching result of the second matching processor 77; and an output unit 81 that outputs data stored in the second matching result storage device 79 to other program modules or the like.

Figure 9:
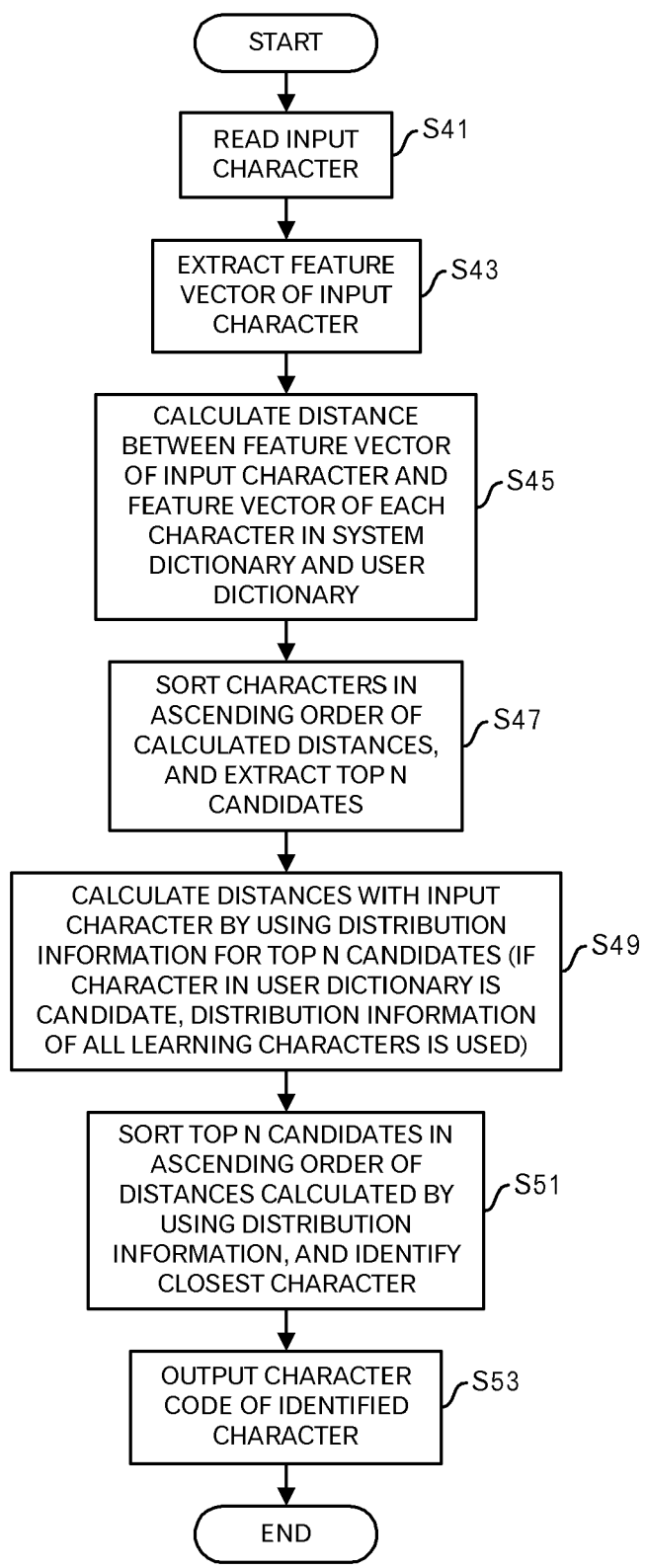
FIG. 9 is a diagram depicting a processing flow in the third embodiment of this technique.

Next, processing contents of the character recognition processing apparatus depicted in FIG. 8 will be explained by using FIGS. 9 and 10. First, the input character reader 61 reads input characters to be recognized, for example, optically, and stores the reading result into the reading result storage device 63 (step S41). This processing itself is the same as the conventional one. Therefore, further explanation is omitted. Next, the feature vector extractor 65 carries out a processing to extract the feature vectors of the input characters for the reading result stored in the reading result storage device 63, and stores data of the extracted feature vectors into the feature vector storage device 67 (step S43). This processing is also the same as the conventional one. Therefore, further explanation is omitted.

Then, the first matching processor 69 calculates the distances with the feature vector of the input character, which is stored in feature vector storage device 67 by using the average vectors of the feature vectors of the respective character codes, which are stored in the system dictionary 71, and the feature vectors of the respective character codes, which are stored in the user dictionary 73, without using the distribution information, and stores the distances into the first matching result storage device 45 (step S45). The method for calculating the distance without using the distribution information is the same as the method described at the step S5.

After that, the first matching processor 69 sorts the character codes in an ascending order of the calculated distances, extracts the top N candidates and stores the top N candidates into the first matching result storage device 75 (step S47). For example, data as depicted in FIG. 3 is stored into the first matching result storage device 75.

Then, the second matching processor 77 calculates a distance with the input character by using the distribution information for each of the top N candidates, which are stored in the first matching result storage device 75, and stores the calculated distances into the second matching result storage device 79 (step S49). At this time, as for the input character, the feature vector of the input character, which is stored in the feature vector storage device 67 is used. As for the character registered in the system dictionary 71, the average vector of the feature vector and the distribution information, which are stored in the system dictionary 71, are used. As for the characters registered in the user dictionary 73, the feature vector stored in the user dictionary 73 and the distribution information 711 of all learning characters, which were used when creating the system dictionary 71, are used.

Figure 10:
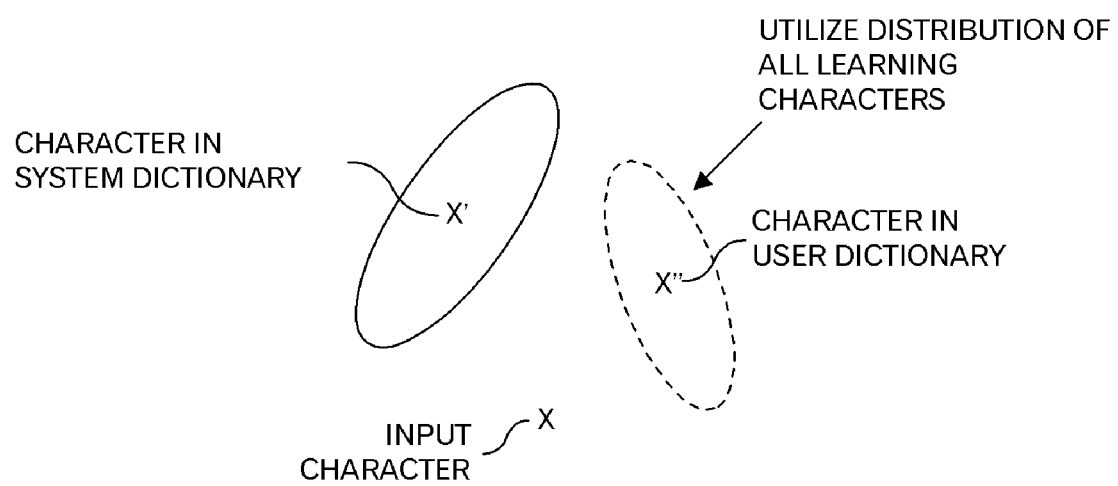
FIG. 10 is a schematic diagram depicting an outline of the third embodiment of this technique.

Namely, as depicted in FIG. 10, the distribution of all learning characters used when creating the system dictionary 71 is used for the character X" in the user dictionary 73, irrelatively to the input character X and the character X' in the system dictionary 71.

The distance to be calculated at the step S49 by using the distribution information is calculated according to MQDF. Because the specific calculation is the same as the step S11, the explanation is omitted.

Then, the second matching processor 77 sorts the top N candidates in an ascending order of the distance calculated by using the distribution information, identifies the character whose distance with the input character is closest among the top N candidates, and stores the identified character code into the second matching result storage device 79 (step S51).

Finally, the output unit 81 outputs the character code identified at the step S51 to other program modules or the like, which utilize the character recognition result (step S53). Then, the processing is completed.

By carrying out such a processing, the size of the user dictionary 73 does not become large too much, because the distribution information is not included in the user dictionary 73. However, the distance can be calculated by using the distribution information for the characters in the user dictionary 73 like the characters in the system dictionary 71, and it becomes possible to output more desirable recognition results.

Although it will be explained later, it is grasped that it is useful for the improvement of the recognition accuracy to use the distribution information 711 of all learning characters used when the creating the system dictionary 71.

FIG. 11 depicts effects of the first to third embodiments. In FIG. 11, for each of cases including (a) a case of only the system dictionary, (b) a case of the system dictionary and the user dictionary in which only a specific character (specifically, input character) is registered, (c) a case of the system dictionary and the user dictionary in which the same character codes as the character codes registered in the system dictionary for the font "A" are registered, (d) a case of the system dictionary and the user dictionary in which character codes more than (c) for the font "A" are registered and (e) a case of the system dictionary and the user dictionary in which the same character codes as the character codes registered in the system dictionary for the font "B" are registered, the recognition ratios of the specific character by (0) the conventional method (using Cityblock distance), (1) the first embodiment, (2) the second embodiment and (c) the third embodiment are indicated. Here, in a case of (a) only the system dictionary, the recognition ratios by the first to third embodiments, which use the distribution information, are higher than the conventional method, as a matter of course. Also as for the cases (b), (c) and (e), the same results are obtained. The types of fonts are not related. As for the case of (d) more character codes are registered in the user dictionary, the recognition ratio of the second embodiment is better than that of the first embodiment, and the recognition ratio of the third embodiment is better than that of the second embodiment.

Fourth Embodiment

Figure 12:
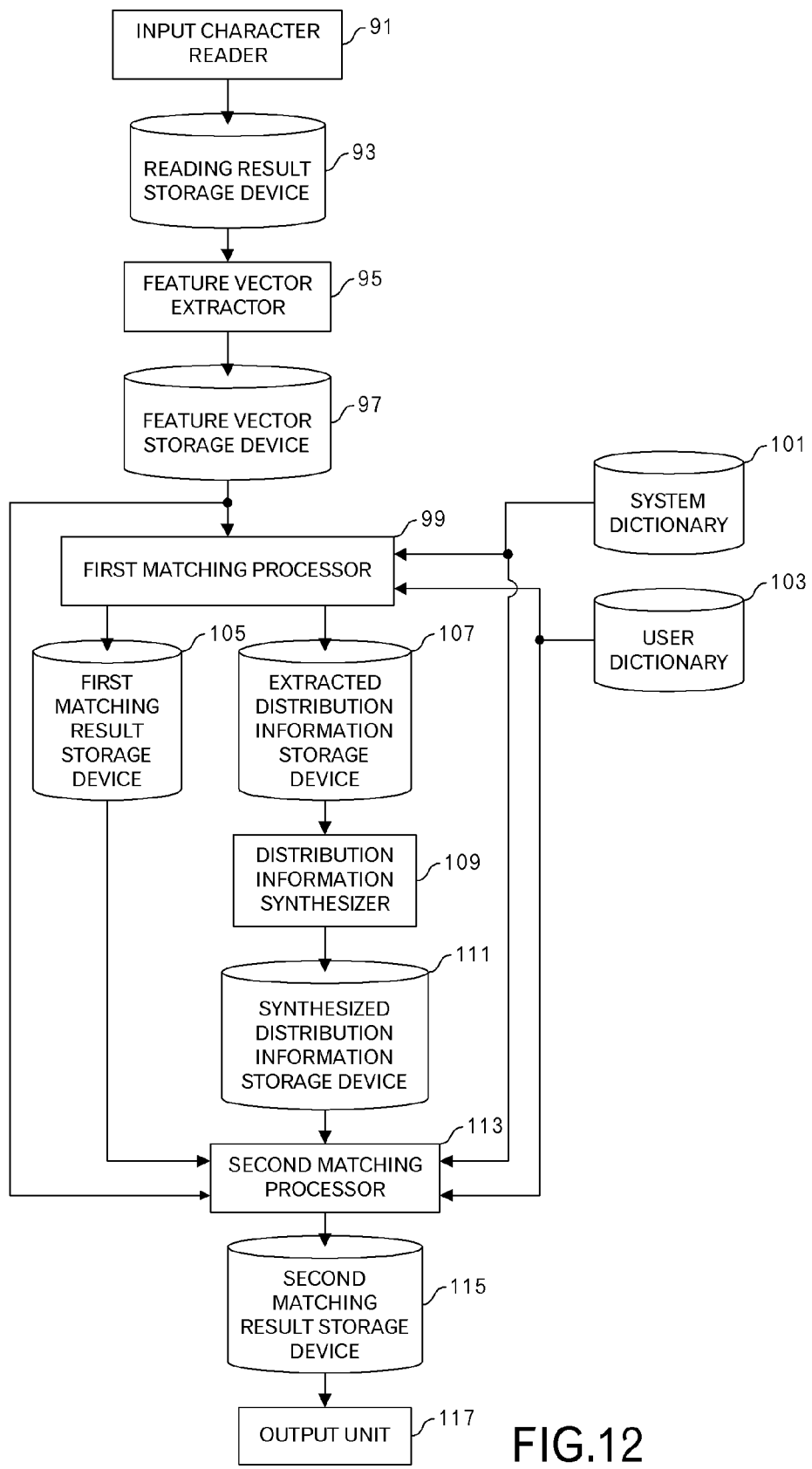
FIG. 12 is a functional block diagram in a fourth embodiment of this technique.

FIG. 12 depicts a functional block diagram of a character recognition processing apparatus according to the fourth embodiment of this technique. The character recognition processing apparatus according to this embodiment has an input character reader 91 that reads characters, for example, optically; a reading result storage device 93 that stores a reading result by the input character reader 91; a feature vector extractor 95 that carries out a processing to extract feature vectors for the input characters based on data stored in the reading result storage device 93; a feature vector storage device 97 that stores data of the feature vectors extracted by the feature vector extractor 95; a system dictionary 101 that stores an average vector of the feature vectors and distribution information (including an eigen value, eigen vector and the like) for each of the predetermined character codes; a user dictionary 103 that stores the feature vectors for character codes specified by the user; a first matching processor 99 that carries out a processing to calculate the distance with the feature vector of the input character by using data stored in the feature vector storage device 97, the system dictionary 101 and the user dictionary 103 without using the distribution information; a first matching result storage device 105 that stores the processing result of the first matching processor 99; an extracted distribution information storage device 107 that stores the distribution information extracted by the first matching processor 99 from the system dictionary 101; a distribution information synthesizer 109 that carries out a processing to synthesize the distribution information stored in the extracted distribution information storage device 107; a synthesized distribution information storage device 111 that stores synthesized distribution information that is the processing result by the distribution information synthesizer 109; a second matching processor 113 that carries out a processing to calculate the distance for the input character based on the distribution information by using data stored in the feature vector storage device 97, the first matching result storage device 105, the synthesized distribution information storage device 111, the system dictionary 101 and the user dictionary 103; a second matching result storage device 115 that stores the processing result by the second matching processor 13; and an output unit 117 that outputs data stored in the second matching result storage device 115 to other program modules or the like.

Figure 13A:
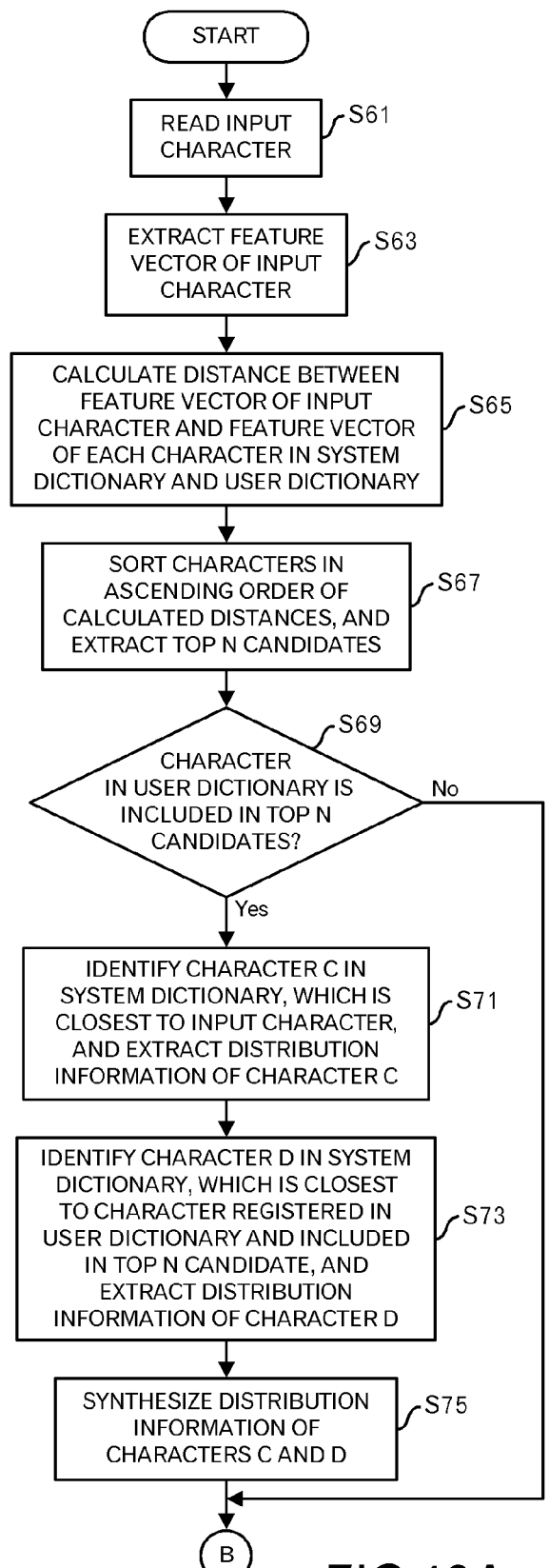
FIG. 13A is a diagram depicting a processing flow in a fourth embodiment of this technique.

Next, processing contents of the character recognition processing apparatus according to this embodiment will be explained by using FIGS. 13A to 14. First, the input character reader 91 reads input characters to be recognized, for example, optically, and stores the reading result into the reading result storage device 93 (step S61). This processing itself is the same as the conventional one. Therefore, further explanation is omitted. Next, the feature vector extractor 95 carries out a processing to extract the feature vectors of the input characters for the reading result stored in the reading result storage device 93, and stores data of the extracted feature vectors into the feature vector storage device 97 (step S63). This processing is also the same as the conventional one. Therefore, further explanation is omitted.

Then, the first matching processor 99 calculates the distances with the feature vector of the input character by using the average vectors of the feature vectors of the respective character codes, which are stored in the system dictionary 101, and the feature vectors of the respective character codes, which are stored in the user dictionary 103, without using the distribution information, and stores the calculated distances into the first matching result storage device 105 (step S65). The method for calculating the distance without using the distribution information is the same as the method described at the step S5.

After that, the first matching processor 99 sorts the character codes in an ascending order of the calculated distances, extracts the top N candidates and stores the top N candidates into the first matching result storage device 105 (step S67). For example, data as depicted in FIG. 3 is stored into the first matching result storage device 105.

Here, the first matching processor 99 scans the first matching result storage device 105 to judge whether or not the top N candidates include characters registered in the user dictionary 103 (step S69). When no character registered in the user dictionary 103 is included in the top N candidates, the processing shifts to a processing depicted in FIG. 13B through a terminal B. On the other hand, when the character registered in the user dictionary 103 is included in the top N candidates, the first matching processor 99 scans the first matching result storage device 105 to identify a character C in the system dictionary 41, which is closest to (namely, higher in the first matching result storage device 105) the input character, among the top N candidates, extracts the distribution information of the character C from the system dictionary 101, and stores the extracted distribution information into the extracted distribution information storage device 107 (step S71). In addition, the first matching processor 99 identifies a character D in the system dictionary 101, which is closest to the character, which is registered in the user dictionary 103 and included in the top N candidates, reads out the distribution information of the character D from the system dictionary 101, and stores the extracted distribution information into the extracted distribution information storage device 107 (step S73). Specifically, by using, as reference, the character registered in the user dictionary 103 among the top N candidates, the distances with all of the characters registered in the system dictionary 101 is calculated without using the distribution information, and the closest character D registered in the system dictionary 41 is identified. When plural characters registered in the user dictionary 103 are included in the top N candidates, the aforementioned processing is carried out for each of the characters, which are registered in the user dictionary 103 and included in the top N candidates.

Then, the distribution information synthesizer 109 synthesizes the distribution information of the characters C and D, which is stored in the extracted distribution information storage device 107, and stores the distribution information that is the synthesized result into the synthesized distribution information storage device 111 (step S75).

As for the synthesis processing of the distribution information, either of (1) detailed processing and (2) simplified processing is carried out.

(1) In case of the detailed processing, the following processing is carried out. Namely, two distributions are represented as described below. Then, the number of samples at the learning of the distribution 1 is represented by $\alpha_1$ and the number of samples at the learning of the distribution 2 is represented by $\alpha_2$.

(Distribution 1)
Average vector: µ1
Eigen vector: $\Lambda_1$
i-th eigen vector: $a_{1i}$
Ratio of the number of samples at the learning: $\alpha_1/(\alpha_1+\alpha_2)$
Variance-covariance matrix generated from the eigen value and eigen vector: $\Sigma_1$
(Distribution 2)
Average vector: $\mu_2$
Eigen vector: $\Lambda_2$
i-th eigen vector: $a_{2i}$
Ratio of the number of samples at the learning: $\alpha_2/(\alpha_1+\alpha_2)$
Variance-covariance matrix generated from the eigen value and eigen vector: $\Sigma_2$ The conversion from the eigen value and eigen vector to the variance-covariance matrix is carries out as follows:

$$\Sigma = [a_1, \ldots a_n] \Lambda [a_1, \ldots a_n]^T$$

Incidentally, $\Lambda = \text{diag}\{\lambda_1, \ldots \lambda_n\}$ ("diag" is a symbol representing the values are arranged at the diagonal elements), and $\lambda_k$ represents the eigen value, and $a_k$ represents the corresponding eigen vector.

At this time, the average vector $\hat{\mu}$ (representing "^" is on µ) of the distribution generated by synthesizing these two distributions and ij element $\hat{\sigma}_{ij}$ (representing "^" is on σ) of the variance-covariance matrix are described below. Incidentally, $\mu_{1i}$ represents a value of the i-th element of the average vector of the distribution 1, and $\sigma_{1ij}$ represents a value of the ij element of $\Sigma_1$.

$$\hat{\mu} = \alpha_1 \mu_1 + \alpha_2 \mu_2$$

$$\hat{\sigma}_{ij} = \alpha_1(\hat{\mu}_i - \mu_{1i})(\hat{\mu}_j - \mu_{1j}) + \alpha_2(\hat{\mu}_i - \mu_{2i})(\hat{\mu}_j - \mu_{2j}) + \alpha_1 \sigma_{1ij} + \alpha_2 \sigma_{2ij}$$

The conversion from the variance-covariance matrix to the eigen value or eigen vector is carried out by the well-known eigen value decomposition processing. Therefore, further explanation is omitted.

(2) In case of the simplified processing, the eigen values of the two distributions is averaged, and the average vector of the eigen vectors of the two distributions are calculated. This method may be adopted based on the trade-off between the processing speed and the accuracy.

Figure 13B:
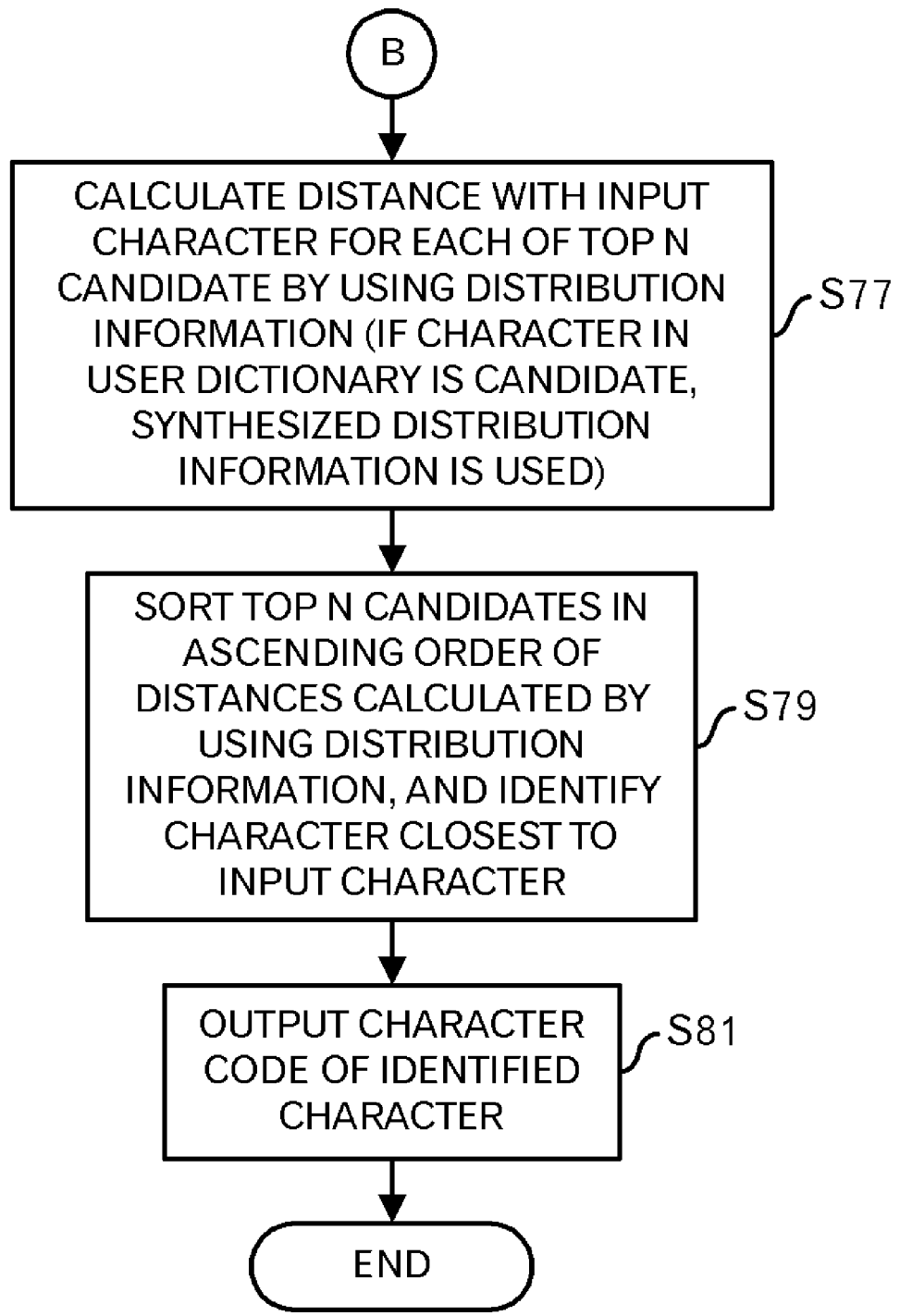
FIG. 13B is a diagram depicting a processing flow in the fourth embodiment of this technique.

Also after the step S75, the processing shifts to the processing depicted in FIG. 13B through the terminal B.

Shifting to the explanation of the processing depicted in FIG. 13B, the second matching processor 113 calculates, for each of the top N candidates, which are stored in the first matching result storage device 105, the distance with the input character by using the distribution information, and stores the calculated distances into the second matching result storage device 115 (step S77). At this time, as for the input character, the feature vector of the input character, which is stored in the feature vector storage device 97, is used, and as for the characters in the system dictionary 101, the average vectors of the feature vectors and the distribution information, which are stored in the system dictionary 101, are used. As for the characters in the user dictionary 103, the feature vectors stored in the user dictionary 103 and the synthesized distribution information, which was synthesized at the step S75 and is stored in the synthesized distribution information storage device 111, are used.

Figure 14:
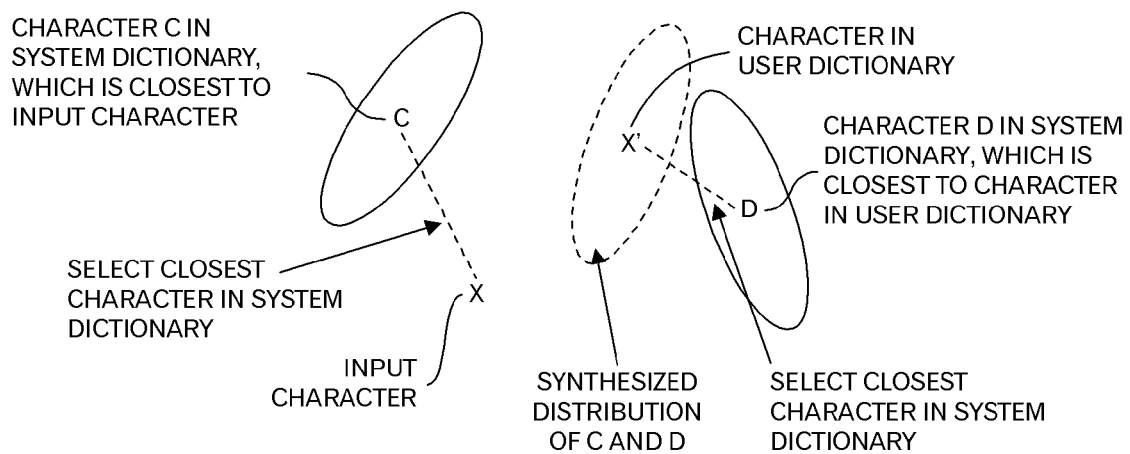
FIG. 14 is a schematic diagram depicting an outline of the fourth embodiment of this technique.

Namely, as depicted in FIG. 14, the character C in the system dictionary 101, which is closest to the input character X, is identified, the character D in the system dictionary 101, which is closest to the character X' in the user dictionary 103, which is judged to be close to the input character X, is identified and the distribution information of the characters C and D is synthesized and utilize for the character X' of the user dictionary 103.

The distance to be calculated at the step S77 by using the distribution information is calculated according to MQDF. Because the specific processing is the same as the step S11, further explanation is omitted.

Then, the second matching processor 113 sorts the top N candidates in an ascending order of the distances calculated by using the distribution information, identifies the character whose distance is shortest among the top N candidates, and stores the character code of the identified character into the second matching result storage device 115 (step S79).

Finally, the output unit 117 outputs the character code of the character identified at the step S79 to other program modules or the like, which uses the character recognition result (step S81). Then, the processing is completed.

By carrying out such a processing, the size of the user dictionary 103 does not become large too much, because the distribution information is not included in the user dictionary 103. However, the distance can be calculated by using the distribution information for the characters in the user dictionary 103 like the characters in the system dictionary 101, and it becomes possible to output more desirable recognition results. Although this embodiment is a combination of the first and second embodiments, the distribution information, which is more reliable, can be used by the synthesis of the distribution information.

Fifth Embodiment

Figure 15:
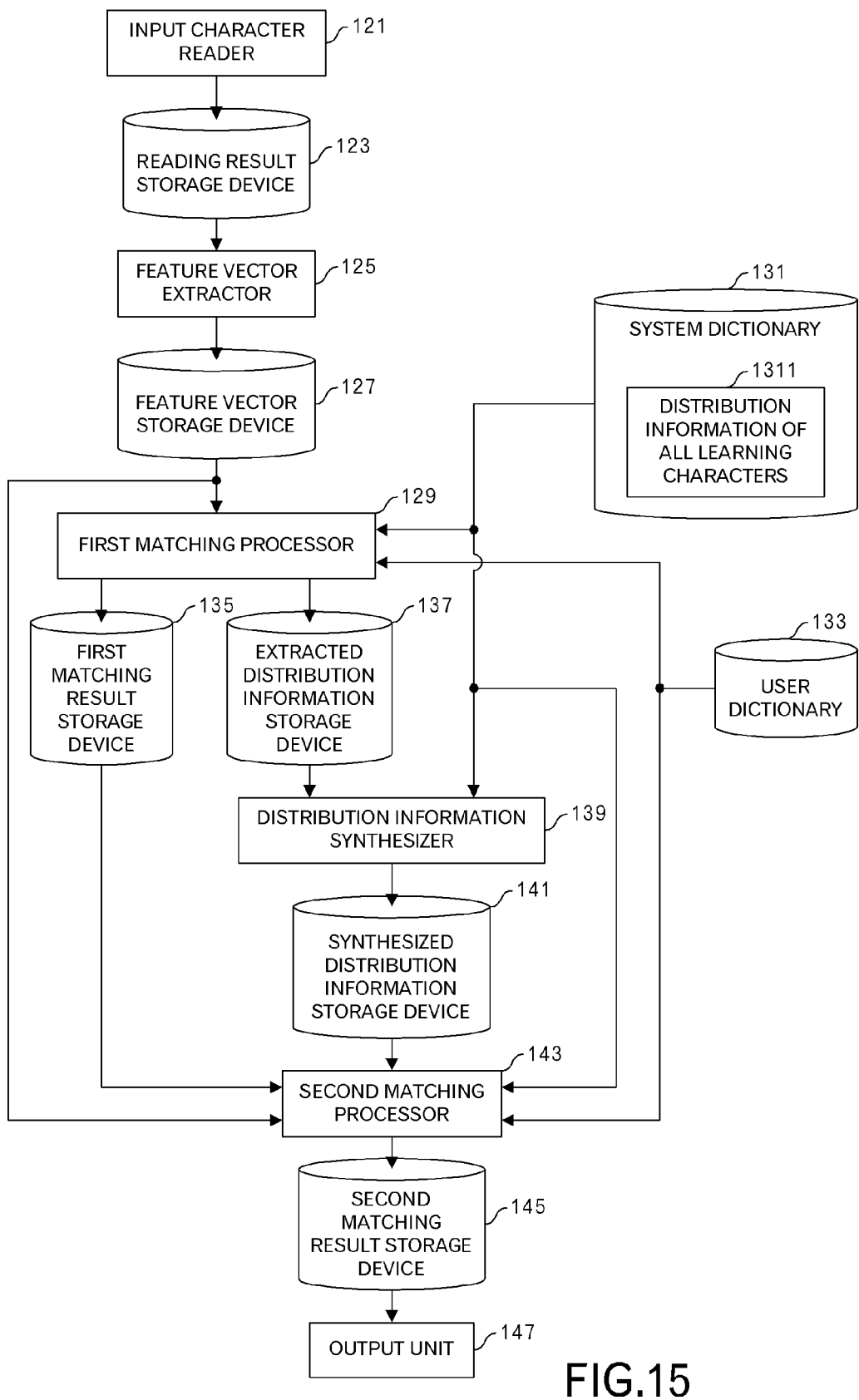
FIG. 15 is a functional block diagram in fifth and sixth embodiments of this technique.

FIG. 15 depicts a functional block diagram of a character recognition processing apparatus according to the fifth embodiment of this technique. The character recognition processing apparatus according to this embodiment has an input character reader 121 that reads characters, for example, optically; a reading result storage device 123 that stores a reading result by the input character reader 121; a feature vector extractor 125 that carries out a processing to extract feature vectors for the input characters based on data stored in the reading result storage device 123; a feature vector storage device 127 that stores data of the feature vectors extracted by the feature vector extractor 125; a system dictionary 131 that stores an average vector of the feature vectors and distribution information (including an eigen value, eigen vector and the like) for each of the predetermined character codes in addition to distribution information 1311 of all learning characters used when creating the system dictionary 131; a user dictionary 133 that stores the feature vectors for character codes specified by the user; a first matching processor 129 that carries out a processing to calculate the distances with the feature vector of the input character by using data stored in the feature vector storage device 127, the system dictionary 131 and the user dictionary 133 without using the distribution information; a first matching result storage device 135 that stores the processing result of the first matching processor 129; an extracted distribution information storage device 137 that stores the distribution information extracted by the first matching processor 129 from the system dictionary 131; a distribution information synthesizer 139 that carries out a processing to synthesize the distribution information stored in the extracted distribution information storage device 137 and the distribution information 1311 of all learning characters, which is stored in the system dictionary 131; a synthesized distribution information storage device 141 that stores synthesized distribution information that is the processing result by the distribution information synthesizer 139; a second matching processor 143 that carries out a processing to calculate the distance for the input character based on the distribution information by using data stored in the feature vector storage device 127, the first matching result storage device 135, the synthesized distribution information storage device 141, the system dictionary 131 and the user dictionary 133; a second matching result storage device 145 that stores the processing result by the second matching processor 143; and an output unit 147 that outputs data stored in the second matching result storage device 145 to other program modules or the like.

Figure 16A:
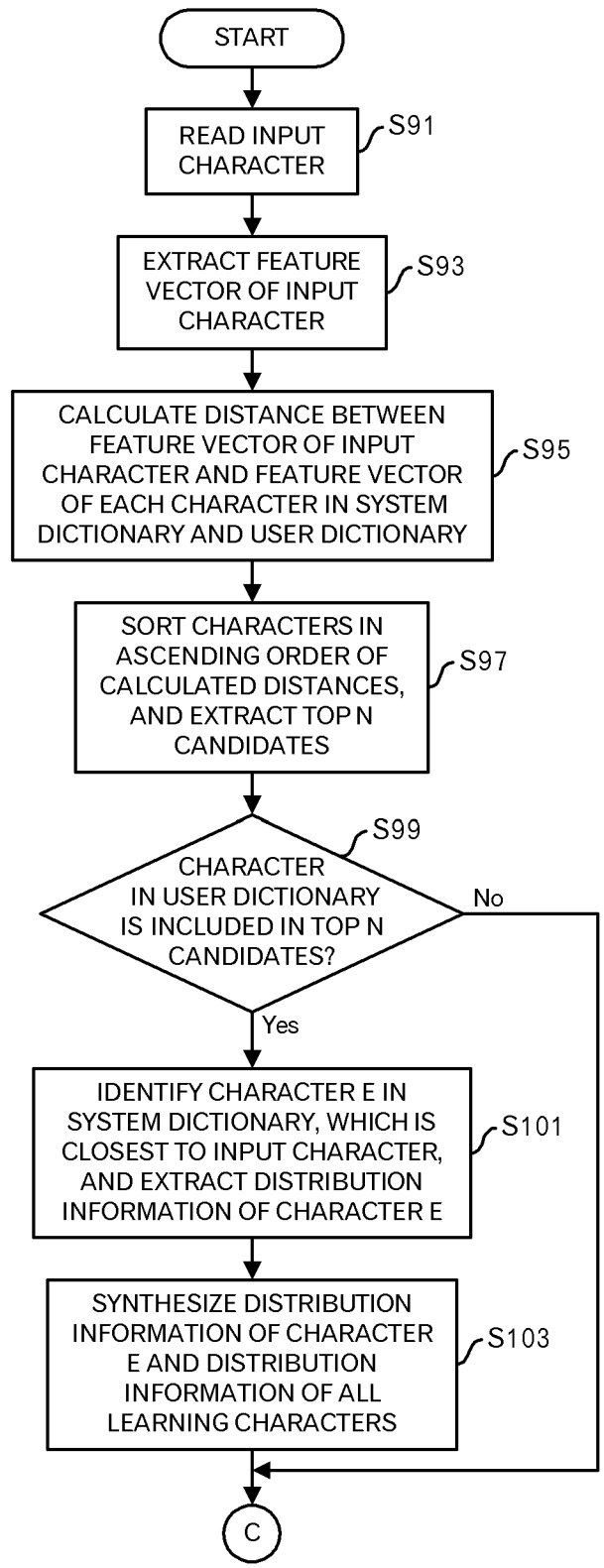
FIG. 16A is a diagram depicting a processing flow in the fifth embodiment of this technique.

Next, processing contents of the character recognition processing apparatus according to this embodiment will be explained by using FIGS. 16A to 17. First, the input character reader 121 reads input characters to be recognized, for example, optically, and stores the reading result into the reading result storage device 123 (step S91). This processing itself is the same as the conventional one. Therefore, further explanation is omitted. Next, the feature vector extractor 125 carries out a processing to extract the feature vectors of the input characters for the reading result stored in the reading result storage device 123, and stores data of the extracted feature vectors into the feature vector storage device 127 (step S93). This processing is also the same as the conventional one. Therefore, further explanation is omitted.

Then, the first matching processor 129 calculates the distances with the feature vector of the input character, which is stored in the feature vector storage device 127, by using the average vectors of the feature vectors of the respective character codes, which are stored in the system dictionary 131, and the feature vectors of the respective character codes, which are stored in the user dictionary 133, without using the distribution information, and stores the calculated distances into the first matching result storage device 135 (step S95).

The method for calculating the distance without using the distribution information is the same as the method described at the step S5.

After that, the first matching processor 129 sorts the character codes in an ascending order of the calculated distances, extracts the top N candidates and stores the top N candidates into the first matching result storage device 135 (step S97). For example, data as depicted in FIG. 3 is stored into the first matching result storage device 135.

Here, the first matching processor 129 scans the first matching result storage device 135 to judge whether or not the top N candidates include characters registered in the user dictionary 133 (step S99). When no character registered in the user dictionary 133 is included in the top N candidates, the processing shifts to a processing depicted in FIG. 16B through a terminal C. On the other hand, when the character registered in the user dictionary 133 is included in the top N candidates, the first matching processor 129 scans the first matching result storage device 135 to identify a character E in the system dictionary 131, which is closest to (namely, higher in the first matching result storage device 135) the input character, among the top N candidates, extracts the distribution information of the character E from the system dictionary 131, and stores the extracted distribution information into the extracted distribution information storage device 137 (step S101).

Then, the distribution information synthesizer 139 synthesizes the distribution information of the character E, which is stored in the extracted distribution information storage device 137, and the distribution information 1311 of all learning characters, which is stored in the system dictionary 131, and stores the distribution information that is the synthesis result into the synthesized distribution information storage device 141 (step S103). The synthesis processing of the distribution information is the same as the method described in the fourth embodiment. Therefore, further explanation is omitted, here. Also after the step S103, the processing shifts to the processing depicted in FIG. 16B through the terminal C.

Figure 16B:
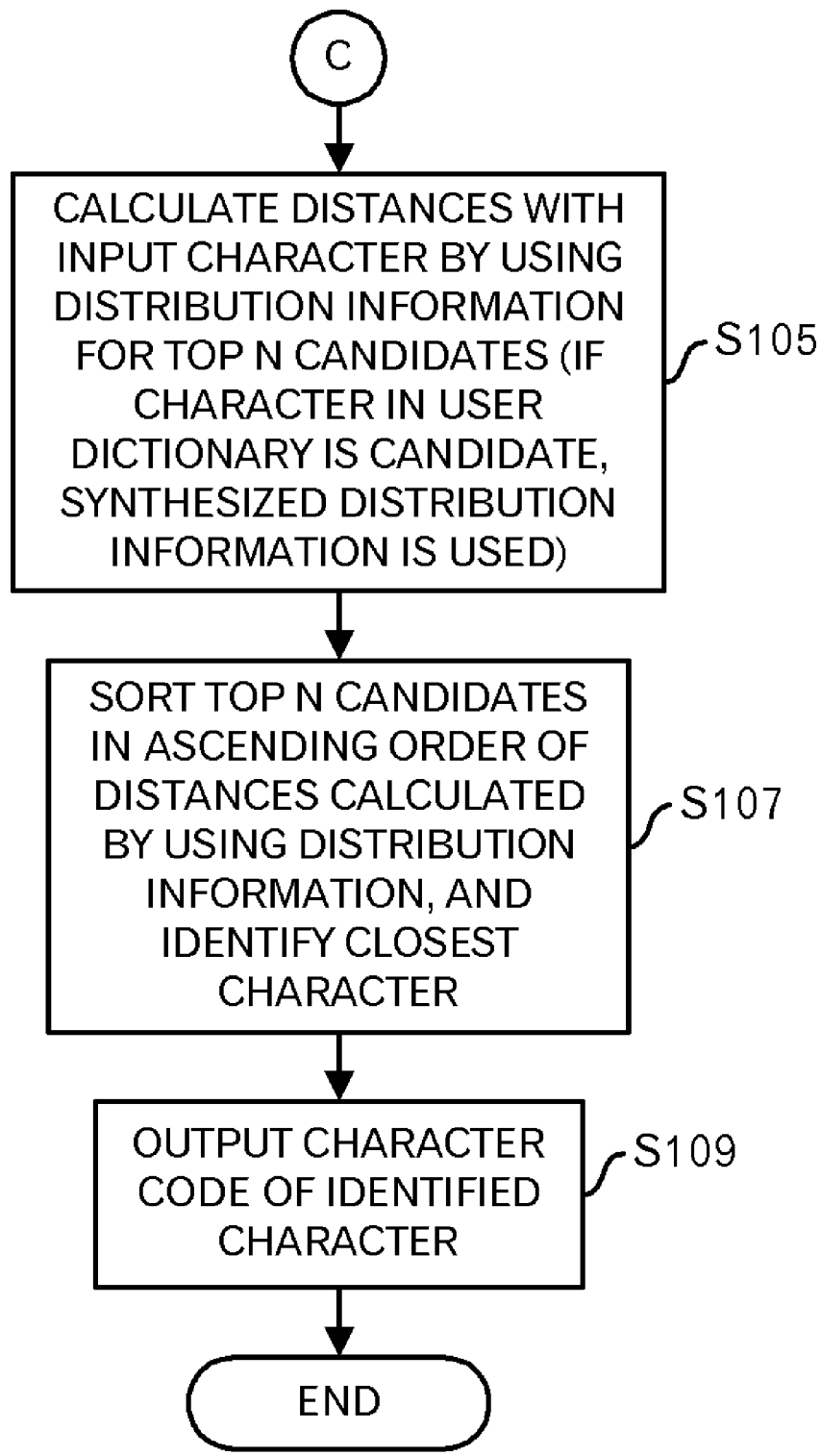
FIG. 16B is a diagram depicting a processing flow in the fifth embodiment of this technique.

Shifting to the explanation of the processing depicted in FIG. 16B, the second matching processor 143 calculates the distance with the input character for each of the top N candidates stored in the first matching result storage device 135, by using the distribution information, and stores the distances into the second matching result storage device 145 (step S105). At this time, as for the input character, the feature vector of the input character, which is stored in the feature vector storage device 127, is stored. As for the characters in the system dictionary 131, the average vector of the feature vectors and the distribution information, which are stored in the system dictionary 131, are used. Furthermore, as for the characters in the user dictionary 133, the feature vector stored in the user dictionary 133 and the distribution information, which is synthesized at the step S103 and stored in the synthesized distribution information storage device 141, are used.

Figure 17:
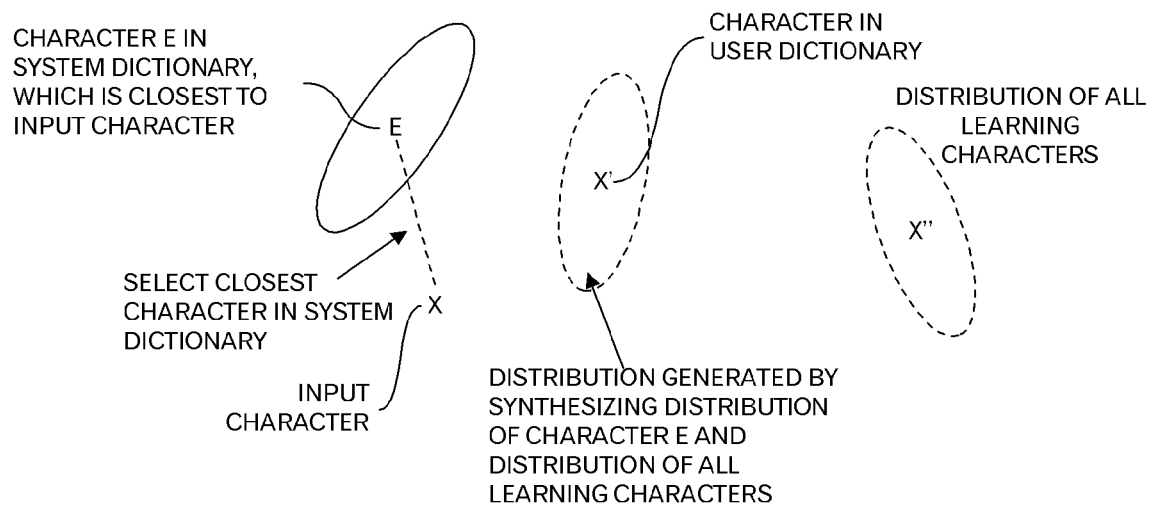
FIG. 17 is a schematic diagram depicting an outline of the fifth embodiment of this technique.

Namely, as depicted in FIG. 17, the character E in the system dictionary 131, which is closest to the input character X, is identified, and the distribution of the character E and the distribution of all learning characters are synthesized, and the synthesized distribution information is utilized for the character X' in the user dictionary 133.

The distance to be calculated at the step S105 by using the distribution information is calculated according to MQDF. Because the specific contents are the same the step S11, the further explanation is omitted.

Then, the second matching processor 143 sorts the top N candidates in an ascending order of the distances calculated by using the distribution information, identifies the character whose distance is shortest among the top N candidates, and stores the character code of the identified character into the second matching result storage device 145 (step S107).

Finally, the output unit 147 outputs the character code of the character identified at the step S107 to other program modules or the like, which use the character recognition result (step S109). Then, the processing is completed.

By carrying out such a processing, the size of the user dictionary 133 does not become large too much, because the distribution information is not included in the user dictionary 133. However, the distance can be calculated by using the distribution information for the characters in the user dictionary 133 like the characters in the system dictionary 131, and it becomes possible to output more desirable recognition results. Although this embodiment is a combination of the first and third embodiments, the distribution information, which is more reliable, can be used by the synthesis of the distribution information.

Sixth Embodiment

Figure 18A:
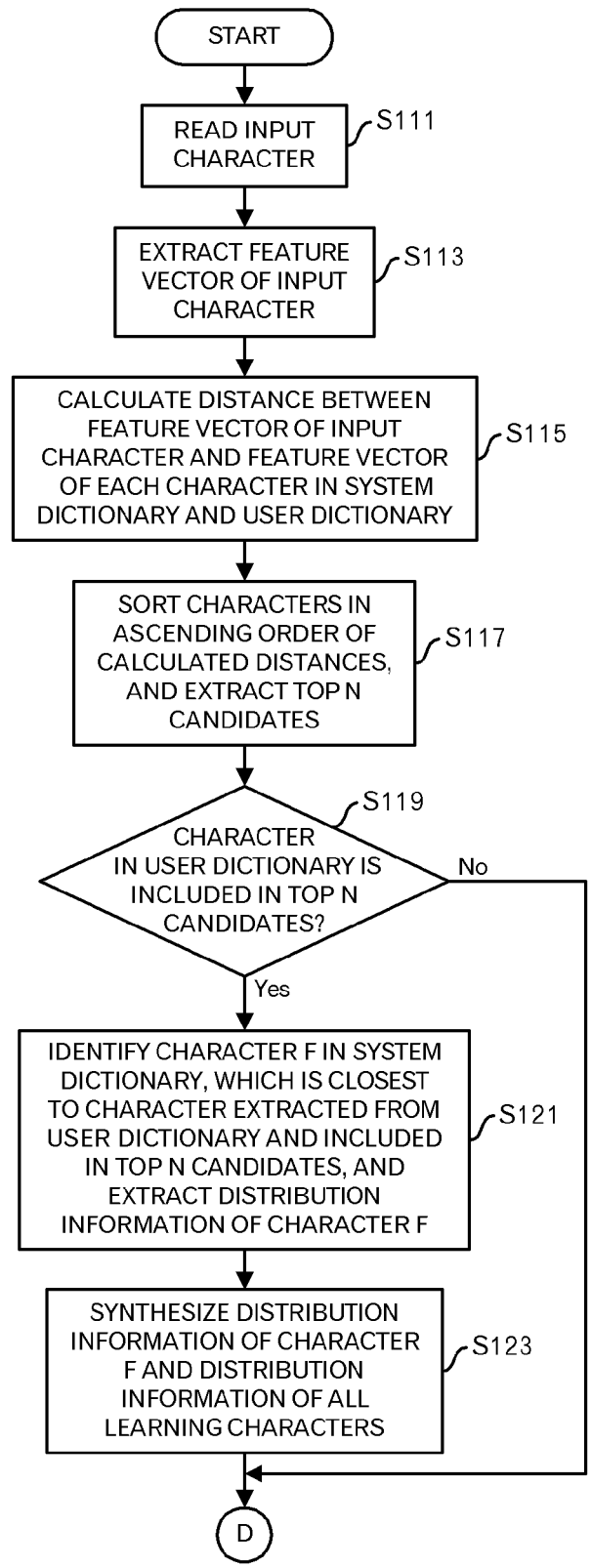
FIG. 18A is a diagram depicting a processing in the sixth embodiment of this technique.

The functional block diagram of a character recognition processing apparatus according to the sixth embodiment of this technique is basically the same as the diagram depicted in FIG. 15. Therefore, although the processing contents are partially different, it is assumed that the same configuration is adopted. Then, in the following, the character recognition processing apparatus according to this embodiment will be explained by using FIGS. 18A to 19.

First, the input character reader 121 reads input characters to be recognized, for example, optically, and stores the reading result into the reading result storage device 123 (step S111). This processing itself is the same as the conventional one. Therefore, further explanation is omitted. Next, the feature vector extractor 125 carries out a processing to extract the feature vectors of the input characters for the reading result stored in the reading result storage device 123, and stores data of the extracted feature vectors into the feature vector storage device 127 (step S113). This processing is also the same as the conventional one. Therefore, further explanation is omitted.

Then, the first matching processor 129 calculates the distances with the feature vector of the input character, which is stored in the feature vector storage device 127 by using the average vectors of the feature vectors of the respective character codes, which are stored in the system dictionary 131, and the feature vectors of the respective character codes, which are stored in the user dictionary 133, without using the distribution information, and stores the distances into the first matching result storage device 135 (step S115). The method for calculating the distance without using the distribution information is the same as the method described at the step S5.

After that, the first matching processor 129 sorts the character codes in an ascending order of the calculated distances, extracts the top N candidates and stores the top N candidates into the first matching result storage device 135 (step S117). For example, data as depicted in FIG. 3 is stored into the first matching result storage device 135.

Here, the first matching processor 129 scans the first matching result storage device 135 to judge whether or not the top N candidates include characters registered in the user dictionary 133 (step S99). When no character registered in the user dictionary 133 is included in the top N candidates, the processing shifts to a processing depicted in FIG. 18B through a terminal D. On the other hand, when the character registered in the user dictionary 133 is included in the top N candidates, the first matching processor 129 identifies a character F in the system dictionary 131, which is closest to the character, which is registered in the user dictionary 133 and included in the top N candidates, reads out the distribution information of the character F from the system dictionary 131, and stores the extracted distribution information into the extracted distribution information storage device 137 (step S121). Specifically, by using, as reference, the character, which is registered in the user dictionary 131 and included in the top N candidates, the distances with all of characters in the system dictionary 131 are calculated without using the distribution information to identify the closest character F in the system dictionary 131. When plural characters in the user dictionary 133 are included in the top N candidates, the aforementioned processing is carried out for the respective characters.

Then, the distribution information synthesizer 139 synthesizes the distribution information of the character F, which is stored in the extracted distribution information storage device 137, and the distribution information 1311 of all learning characters, which is stored in the system dictionary 131, and stores the distribution information that is the synthesized result into the synthesized distribution information storage device 141 (step S123). The synthesis processing of the distribution information is the same as the processing described in the fourth embodiment. Therefore, further explanation is omitted, here. Also after the step S123, the processing shifts to the processing depicted in FIG. 18B through a terminal D.

Figure 18B:
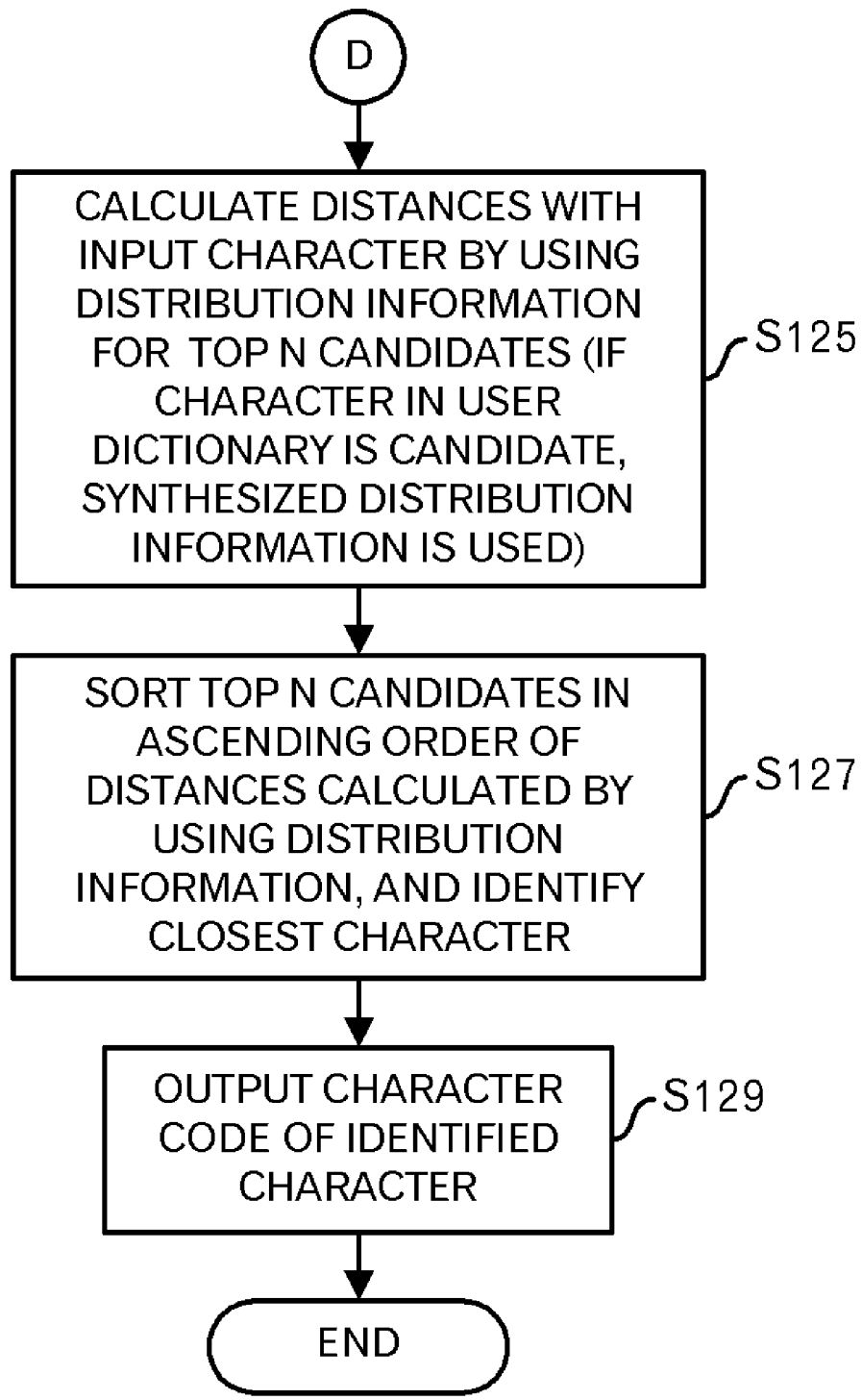
FIG. 18B is a diagram depicting a processing flow in the sixth embodiment of this technique.

Shifting to the explanation of the processing depicted in FIG. 18B, the second matching processor 143 calculates the distances with the input characters for the respective top N candidates stored in the first matching result storage device 135 by using the distribution information, and stores the distances into the second matching result storage device 145 (step S125). At this time, as for the input character, the feature vector of the input character, which is stored in the feature vector storage device 126, is used, and as for the characters in the system dictionary 131, the average vector of the feature vectors and the distribution information, which are stored in the system dictionary 131, are used. Furthermore, as for the characters in the user dictionary 133, the feature vector stored in the user dictionary 133 and the distribution information, which is synthesized at the step S123 and stored in the synthesized distribution information storage device 141, are used.

Figure 19:
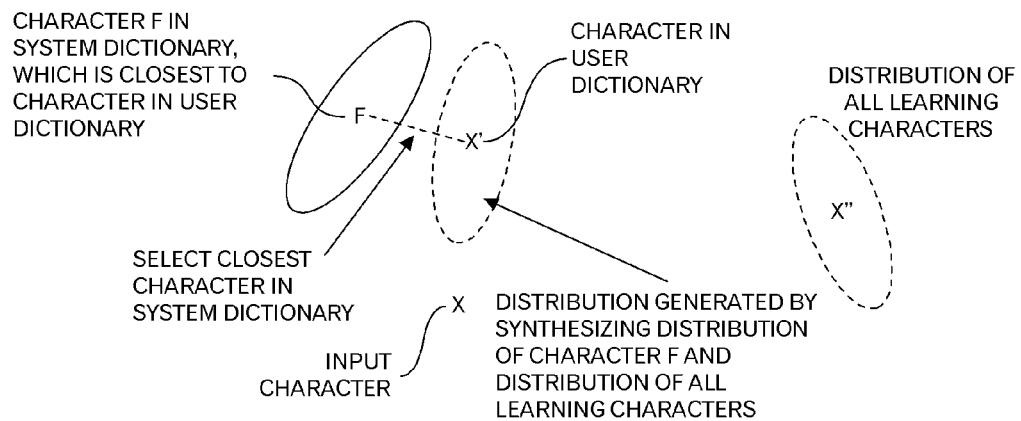
FIG. 19 is a schematic diagram depicting an outline of the sixth embodiment of this technique.

Namely, as depicted in FIG. 19, the character F in the system dictionary 131, which is closest to the character X' in the user dictionary, which is judged to be close to the input character X, is identified, and the distribution of the character F and the distribution of all learning characters are synthesized and the synthesized distribution is used for the character X' of the user dictionary 133.

The distance to be calculated at the step S125 by using the distribution information is calculated according to MQDF. The specific contents are the same as the step S11. Therefore, further explanation is omitted.

Then, the second matching processor 143 sorts the top N candidates in an ascending of the distances calculated by using the distribution information, identifies the closest character among the top N candidates, and stores the character code of the identified character into the second matching result storage device 145 (step S127).

Finally, the output unit 147 outputs the character code of the character identified at the step S127 to other program modules or the like, which use the character recognition result (step S129). Then, the processing is completed.

By carrying out such a processing, the size of the user dictionary 133 does not become large too much, because the distribution information is not included in the user dictionary 133. However, the distance can be calculated by using the distribution information for the characters in the user dictionary 133 like the characters in the system dictionary 131, and it becomes possible to output more desirable recognition results. Although this embodiment is a combination of the second and third embodiments, the distribution information, which is more reliable, can be used by the synthesis of the distribution information.

Although the embodiments of this technique were described, this technique is not limited to these embodiments. For example, it was explained that the distribution information of all learning characters used when creating the system dictionary is used. However, there is a case where the learning characters are limited to desired characters among all learning characters and used.

Furthermore, the functional block diagrams are mere examples, and they do not always match with the actual program module configuration.

In addition, as long as the processing result does not change, the processing flows may be changed, for example, some steps may be executed in parallel, or the order of execution may be changed.

Figure 20:
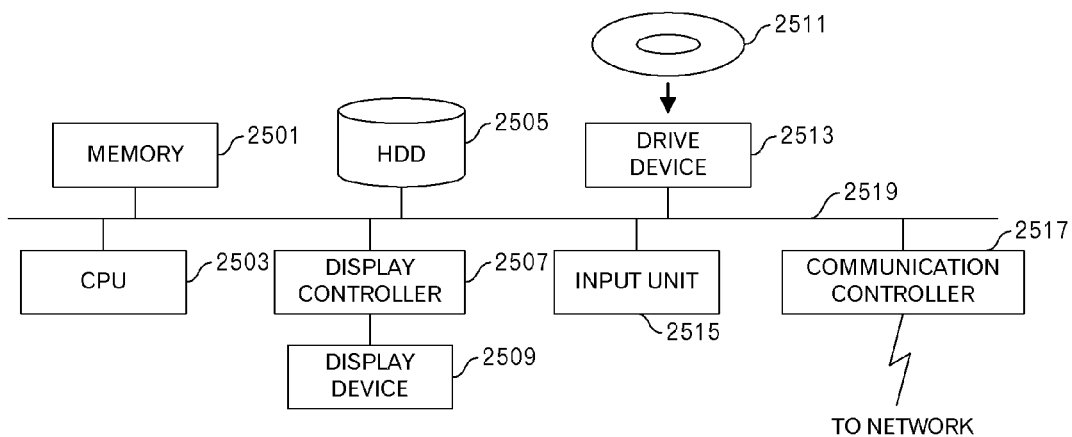
FIG. 20 is a functional block diagram of a computer.

In addition, the character recognition processing apparatus is a computer device as shown in FIG. 20. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 20. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

These embodiments can be outlined as follows:

A character recognition processing method according to a first aspect of this technique includes: extracting a feature vector for an input character from a reading result of the input character; calculating distances between the feature vector for the input character and vectors including average vectors stored in a system dictionary storing, for each character, the average vector of the feature vectors and distribution information, and feature vectors stored in a user dictionary storing, for each character, the feature vector; and extracting a top predetermined number of character codes in an ascending order of the distances; identifying a character code in the system dictionary, which has the average vector whose distance with the feature vector for the input character is shortest to extract the distribution information corresponding to the identified character code from the system dictionary; calculating, for each of the top predetermined number of character codes, a second distance with the feature vector for the input character, by using, for the character codes, which are extracted from the user dictionary and included in the top predetermined number of character codes, the distribution information extracted at the identifying from the system dictionary, and by using, for the character codes, which are extracted from the system dictionary and included in the top predetermined number of character codes, the corresponding distribution information in the system dictionary; and identifying a character code whose second distance is shortest.

Thus, even when the user dictionary does not store the distribution information, it becomes possible to conduct the character recognition with high accuracy based on the distances calculated by using the distribution information.

A character recognition processing method according to a second aspect of this technique includes: extracting a feature vector for an input character from a reading result of the input character; calculating distances between the feature vector for the input character and vectors including average vectors stored in a system dictionary storing, for each character, the average vector of the feature vectors and distribution information, and feature vectors stored in a user dictionary storing, for each character, the feature vector; and extracting a top predetermined number of character codes in an ascending order of the distances; calculating reference distances between the feature vector of each of the character codes, which are extracted from the user dictionary and included in the top predetermined number of character codes, and the average vector of the feature vectors of each character code in the system dictionary to identify a character code in the system dictionary, whose reference distance is shortest; calculating, for each of the top predetermined number of character codes, a second distance with the feature vector for the input character, by using, for the character codes, which are extracted from the user dictionary and included in the top predetermined number of character codes, the distribution information, which corresponds to the character code identified at the extracting and is stored in the system dictionary, and by using, for the character codes, which are extracted from the system dictionary and included in the top predetermined number of character codes, the corresponding distribution information in the system dictionary; and identifying a character code whose second distance is shortest.

Also in such a case, it becomes possible to conduct the character recognition with high accuracy based on the distances calculated by using the distribution information without enlarging the size of the user dictionary too much.

A character recognition processing method according to a third aspect of this technique includes: extracting a feature vector for an input character from a reading result of the input character; calculating distances between the feature vector for the input character and vectors including average vectors stored in a system dictionary storing, for each character, the average vector of the feature vectors and distribution information, and feature vectors stored in a user dictionary storing, for each character, the feature vector; and extracting a top predetermined number of character codes in an ascending order of the distances; calculating, for each of the top predetermined number of character codes, a second distance with the feature vector for the input character, by using, for the character codes, which are extracted from the user dictionary and included in the top predetermined number of character codes, predetermined reference distribution information, and by using, for the character codes, which are extracted from the system dictionary and included in the top predetermined number of character codes, the corresponding distribution information in the system dictionary; and identifying a character code whose second distance is shortest.

Also in such a configuration, when the predetermined reference distribution information is prepared, it becomes possible to conduct the character recognition with high accuracy based on the distances calculated by using the distribution information.

Incidentally, the aforementioned reference distribution information may be distribution information for characters used when creating the system dictionary. The inventors of this application unobviously conceived the improvement of the recognition accuracy by using such reference distribution information.

A character recognition processing method according to a fourth aspect of this technique includes: extracting a feature vector for an input character from a reading result of the input character; calculating distances between the feature vector for the input character and vectors including average vectors stored in a system dictionary storing, for each character, the average vector of the feature vectors and distribution information, and feature vectors stored in a user dictionary storing, for each character, the feature vector; and extracting a top predetermined number of character codes in an ascending order of the distances; generating synthesized distribution information for the character codes, which are extracted from the user dictionary and included in the top predetermined number of character codes, from the distribution information, which is stored in the system dictionary and identified based on at least one of the feature vectors corresponding to the character codes, which are extracted from the user dictionary and included in the top predetermined number of character codes, and the feature vector for the input character; calculating, for each of the top predetermined number of character codes, a second distance with the feature vector for the input character, by using, for the character codes, which are extracted from the user dictionary and included in the top predetermined number of character codes, the synthesized distribution information, and by using, for the character codes, which are extracted from the system dictionary and included in the top predetermined number of character codes, the corresponding distribution information in the system dictionary; and identifying a character code whose second distance is shortest.

Thus, by synthesizing the distribution information, it becomes possible to conduct the character recognition with high accuracy for the character codes without using the distribution information in the user dictionary.

In addition, the aforementioned generating may include: identifying a character code, which is included in the system dictionary and has an average vector whose distance with the feature vector for the input character is shortest, to extract, as first distribution information, distribution information corresponding to the identified character code, from the system dictionary; and calculating reference distances between the feature vectors, which are extracted from the user dictionary and included in the top predetermined number of character codes, and the average vectors of the feature vectors of the respective character codes in the system dictionary to extract, as second distribution information, distribution information of the character code, which is extracted in the system dictionary, and whose reference distance is shortest; and synthesizing the first distribution information and the second distribution information.

Furthermore, the aforementioned generating may include identifying a character code, which is included in the system dictionary and has an average vector whose distance with the feature vector for the input character is shortest, to extract, as the first distribution information, distribution information corresponding to the identified character code from the system dictionary; and synthesizing the first distribution information and the predetermined reference distribution information.

In addition, the aforementioned generating may include calculating second reference distances between the feature vectors of the character codes, which are extracted from the user dictionary and included in the top predetermined number of character codes, and the average vectors of the feature vectors of the respective character codes in the system dictionary to extract, as the first distribution information, the distribution information of the character code, which is included in the system dictionary, and whose second reference distance is shortest; and synthesizing the first distribution information and the predetermined reference distribution information.

Thus, it becomes possible to generate appropriate distribution information of the character codes in the user dictionary, which does not include the distribution information.

Incidentally, it is possible to create a program for causing a computer to execute the aforementioned character recognition processing method, and this program is stored into such a computer-readable storage medium or a storage apparatus such as a flexible disk, a CD-ROM, a magneto-optical disk, a semiconductor memory, or a hard disk. In addition, an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A character recognition processing method, comprising:
   extracting, by using a computer, a feature vector for an input character from a reading result of said input character;
   calculating, by using the computer, distances between said feature vector for said input character and vectors including average vectors stored in a system dictionary storing, for each character, said average vector of said feature vectors and distribution information, and feature vectors stored in a user dictionary storing, for each character, said feature vector;
   extracting, by using the computer, a top predetermined number of character codes in an ascending order of the calculated distances;
   obtaining, by using the computer, second distribution information for said character codes, which are extracted from said user dictionary and included in said top predetermined number of character codes;
   calculating, by using the computer, for each of said top predetermined number of character codes, a second distance with said feature vector for said input character, by using, for said character codes, which are extracted from said user dictionary and included in said top predetermined number of character codes, said second distribution information, and by using, for said character codes, which are extracted from said system dictionary and included in said top predetermined number of character codes, the corresponding distribution information in said system dictionary; and
   identifying, by using the computer, a character code whose second distance is shortest.

2. The character recognition processing method as set forth in claim 1, wherein said obtaining comprises:
   identifying a character code in said system dictionary, which has said average vector whose distance with said feature vector for said input character is shortest; and
   extracting, as said second distribution information, distribution information corresponding to the identified character code from said system dictionary.

3. The character recognition processing method as set forth in claim 1, wherein said obtaining comprises:
   calculating reference distances between said feature vector of each of said character codes, which are extracted from said user dictionary and included in said top predetermined number of character codes, and said average vector of said feature vectors of each said character code in said system dictionary;
   second identifying a character code in said system dictionary, whose reference distance is shortest; and
   reading out, as said second distribution information, distribution information corresponding to said character code identified at said second identifying and is stored in said system dictionary.

4. The character recognition processing method as set forth in claim 3, wherein said predetermined reference distribution information is distribution information for characters used when creating said system dictionary.

5. The character recognition processing method as set forth in claim 1, wherein said second distribution information is predetermined reference distribution information.

6. The character recognition processing method, as set forth in claim 1, wherein said obtaining comprises:
   generating, as said second distribution information, synthesized distribution information for said character codes, which are extracted from said user dictionary and included in said top predetermined number of character codes, from said distribution information, which is stored in said system dictionary and identified based on at least one of said feature vectors corresponding to said character codes, which are extracted from said user dictionary and included in said top predetermined number of character codes, and said feature vector for said input character.

7. The character recognition processing method as set forth in claim 6, wherein said generating comprises:
   identifying a character code, which is included in said system dictionary and has an average vector whose distance with said feature vector for said input character is shortest, to extract, as third distribution information, distribution information corresponding to the identified character code, from said system dictionary;
   calculating reference distances between said feature vector of said character code, which is extracted from said user dictionary and included in said top predetermined number of character codes, and said average vectors of said feature vectors of the respective character codes in said system dictionary to extract, as fourth distribution information, distribution information of said character code, which is extracted from said system dictionary, and whose reference distance is shortest; and
   synthesizing said third distribution information and said fourth distribution information to generate said second distribution information.

8. The character recognition processing method as set forth in claim 6, wherein said generating comprises:
  identifying a character code, which is included in said system dictionary and has an average vector whose distance with said feature vector for said input character is shortest, to extract, as fifth distribution information, distribution information corresponding to the identified character code from said system dictionary; and
  synthesizing said fifth distribution information and predetermined distribution information to generate said second distribution information.

9. The character recognition processing method as set forth in claim 6, wherein said generating comprises:
  calculating second reference distances between said feature vector of said character code, which is extracted from said user dictionary and included in said top predetermined number of character codes, and said average vectors of said feature vectors of the respective character codes in said system dictionary to extract, as seventh distribution information, distribution information of said character code, which is included in said system dictionary, and whose second reference distance is shortest; and
  synthesizing said seventh distribution information and predetermined reference distribution information.

10. A computer-readable storage medium storing a program for causing a computer to execute a character recognition process, comprising:
  extracting a feature vector for an input character from a reading result of said input character;
  calculating distances between said feature vector for said input character and vectors including average vectors stored in a system dictionary storing, for each character, said average vector of said feature vectors and distribution information, and feature vectors stored in a user dictionary storing, for each character, said feature vector;
  extracting a top predetermined number of character codes in an ascending order of the calculated distances;
  obtaining second distribution information for said character codes, which are extracted from said user dictionary and included in said top predetermined number of character codes;
  calculating, for each of said top predetermined number of character codes, a second distance with said feature vector for said input character, by using, for said character codes, which are extracted from said user dictionary and included in said top predetermined number of character codes, said second distribution information, and by using, for said character codes, which are extracted from said system dictionary and included in said top predetermined number of character codes, the corresponding distribution information in said system dictionary; and
  identifying a character code whose second distance is shortest.

11. A character recognition processing apparatus, comprising:
  a first extracting unit to extract a feature vector for an input character from a reading result of said input character;
  a first calculating unit to calculate distances between said feature vector for said input character and vectors including average vectors stored in a system dictionary storing, for each character, said average vector of said feature vectors and distribution information, and feature vectors stored in a user dictionary storing, for each character, said feature vector;
  a second extracting unit to extract a top predetermined number of character codes in an ascending order of the calculated distances;
  an obtaining unit to obtain second distribution information for said character codes, which are extracted from said user dictionary and included in said top predetermined number of character codes;
  a second calculating unit to calculate, for each of said top predetermined number of character codes, a second distance with said feature vector for said input character, by using, for said character codes, which are extracted from said user dictionary and included in said top predetermined number of character codes, said second distribution information, and by using, for said character codes, which are extracted from said system dictionary and included in said top predetermined number of character codes, the corresponding distribution information in said system dictionary; and
  an identifying unit to identify a character code whose second distance is shortest.

* * * * *